United States Patent
Li et al.

(10) Patent No.: US 11,606,766 B2
(45) Date of Patent: *Mar. 14, 2023

(54) SYNCHRONOUS COMMUNICATION METHOD AND TERMINAL

(71) Applicant: HUAWEI TECHNOLOGIES CO., LTD., Guangdong (CN)

(72) Inventors: Mingchao Li, Beijing (CN); Jiezuo Zhu, Beijing (CN); Jun Zhang, Beijing (CN); Guanglin Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,939

(22) Filed: Jun. 24, 2020

(65) Prior Publication Data
US 2020/0322911 A1    Oct. 8, 2020

Related U.S. Application Data

(63) Continuation of application No. 15/870,277, filed on Jan. 12, 2018, now Pat. No. 10,721,697, which is a continuation of application No. PCT/CN2015/086727, filed on Aug. 12, 2015.

(51) Int. Cl.
*H04W 56/00*    (2009.01)
*H04W 72/02*    (2009.01)
*H04W 92/18*    (2009.01)

(52) U.S. Cl.
CPC ....... *H04W 56/0015* (2013.01); *H04W 72/02* (2013.01); *H04W 92/18* (2013.01)

(58) Field of Classification Search
CPC ..................... H04W 56/0015; H04W 72/02
See application file for complete search history.

(56) References Cited

U.S. PATENT DOCUMENTS

2006/0280226 A1    12/2006  Krasner
2008/0247352 A1*   10/2008  Martin ............... H04W 56/009
                                                          370/319

(Continued)

FOREIGN PATENT DOCUMENTS

CN    1397117 A     2/2003
CN    101371603 A   2/2009

(Continued)

OTHER PUBLICATIONS

Samsung, "On D2D communication related to out-of-coverage UE with TX timing not from eNB," 3GPP TSG RAN WG1 #79, R1-144728, San Francisco, USA, Nov. 17-21, 2014, 5 pages.

(Continued)

*Primary Examiner* — Ricky Q Ngo
*Assistant Examiner* — Stephen N Steiner
(74) *Attorney, Agent, or Firm* — Fish & Richardson P.C.

(57) ABSTRACT

One example method includes obtaining first configuration information, where the first configuration information includes an initial reference time or a scale parameter, determining a current time according to a global navigation (Continued)

satellite system (GNSS) clock, and calculating a transmission timeslot in a device-to-device (D2D) communications system according to the current time and the first configuration information.

20 Claims, 3 Drawing Sheets

(56) References Cited

U.S. PATENT DOCUMENTS

| | | | |
|---|---|---|---|
| 2011/0170465 A1* | 7/2011 | Tavildar | H04W 56/0015 370/311 |
| 2012/0307698 A1 | 12/2012 | Tavildar et al. | |
| 2014/0140269 A1 | 5/2014 | Tavildar et al. | |
| 2014/0185495 A1 | 7/2014 | Kuchibhotla et al. | |
| 2016/0338095 A1* | 11/2016 | Faurie | H04W 28/0278 |
| 2016/0374038 A1 | 12/2016 | Wang | |
| 2018/0199298 A1* | 7/2018 | Wakabayashi | H04W 56/001 |

FOREIGN PATENT DOCUMENTS

| | | |
|---|---|---|
| CN | 102714852 A | 10/2012 |
| CN | 104041151 A | 9/2014 |
| CN | 104303448 A | 1/2015 |
| CN | 104412676 A | 3/2015 |
| CN | 105027523 A | 11/2015 |
| JP | 2013517690 A | 5/2013 |
| JP | 2015535163 A | 12/2015 |
| JP | 2016534604 A | 11/2016 |
| KR | 20130046298 A | 5/2013 |
| WO | 2011088115 A1 | 7/2011 |
| WO | 2014078715 A2 | 8/2014 |
| WO | 2015010542 A1 | 1/2015 |
| WO | 2015021345 A2 | 2/2015 |
| WO | 2015026544 A2 | 2/2015 |
| WO | 2015063186 A1 | 5/2015 |
| WO | 2015116865 A1 | 8/2015 |

OTHER PUBLICATIONS

Qualcomm Incorporated, "Simulation assumptions for D2D synchronization requirements," 3GPP TSG-RAN WG4 #74, R4-150201, Athens, Greece, Feb. 9-13, 2015, 7 pages.
Samsung, "On D2D communication related to out-of-coverage UE with TX timing not from eNB," 3GPP TSG RAN WG1 #78bis, R1-143856, Ljubljana, Slovenia, Oct. 6-10, 2014, 5 pages.
Catt, "Resource allocation for D2D synchronization," 3GPP TSG RAN WG1 Meeting #78, R1-142892, Dresden, Germany, Aug. 18-22, 2014, 5 pages.
Coolpad, "Considerations D2D Synchronization," 3GPP TSG RAN WG1 Meeting #76bis, R1-141721, Shenzhen, China, Mar. 31-Apr. 4, 2014, 4 pages.
ZTE, "D2D Synchronization and Timing," 3GPP TSG-RAN WG1 Meeting #74bis, R1-134306, Guangzhou, China, Oct. 7-11, 2013, 8 pages.
Office Action issued in Chinese Application No. 202010914275.1 dated Jul. 23, 2021, 12 pages (with English translation).
3GPP TS 36.331 V12.6.0 3rd Generation Partnership Project Technical Specification Group Radio Access Network; Evolved Universal Terrestrial Radio Access (E-UTRA);Radio Resource Control (RRC);Protocol specification(Release 12), Technical Specification, Jun. 2015, 449 pages.
Extended European Search Report issued in European Application No. 15900739.2 dated Jun. 7, 2018, 7 pages.
International Search Report and Written Opinion in International Application No. PCT/CN2015/086727, dated May 11, 2016, 18 pages.
Japanese Office Action issued in Japanese Application No. 2018-500732 dated Jan. 24, 2019, 6 pages.
Office Action issued in Chinese Application No. 201580039695.7 dated Mar. 26, 2019, 8 pages.

* cited by examiner

SYNCHRONOUS COMMUNICATION METHOD AND TERMINAL

CROSS-REFERENCE TO RELATED APPLICATIONS

This application is a continuation of U.S. patent application Ser. No. 15/870,277, filed on Jan. 12, 2018, which is a continuation of International Application No. PCT/CN2015/086727, filed on Aug. 12, 2015. All of the afore-mentioned patent applications are hereby incorporated by reference in their entireties.

TECHNICAL FIELD

The present invention relates to the communications field, and in particular, to a synchronous communication method and a terminal.

BACKGROUND

With the continuous development of society, automobiles become increasingly popular. Driving makes it convenient for people to travel, but also has negative impact on human society. A rapid increase in a quantity of vehicles causes a series of problems such as urban traffic congestion, frequent traffic accidents, and environmental degradation. According to statistics, nearly 200,000 traffic accidents occur in China in 2013 with a death toll of 58,000 and a direct economic loss of 1.04 billion yuan. A perfect intelligent transportation system (ITS) is desired from many angles such as personal safety, traffic efficiency, environmental protection, and economic benefits. Currently, the ITS has naturally become a focus of global attention.

At present, a vehicle may obtain information about road conditions or receive an information service in time by means of vehicle-to-vehicle (V2V) communication or vehicle-to-infrastructure (V2I) communication. Specifically, the vehicle may broadcast information such as a vehicle speed, a heading direction, and a specific location of the vehicle and information about whether brakes are slammed on to a surrounding vehicle by means of V2V communication. A driver can better know traffic conditions beyond a line of sight after obtaining the information, so as to predict and avoid a dangerous situation. During V2I communication, in addition to exchange of the foregoing safety information, roadside infrastructure may further provide the vehicle with all kinds of service information and an access to a data network. Functions such as electronic toll collection and in-vehicle entertainment greatly improve traffic intelligence. A network used by V2V/V2I communication is referred to as the Internet of Vehicles.

Long Term Evolution (LTE) is a mainstream wireless communications technology at present. A device-to-device (D2D) technology is considered as an important characteristic and is standardized in the 3rd Generation Partnership Project (3GPP) LTE R12, and supports direct communication between user terminals. Considering that a V2V/V2I communication scenario also belongs to terminal direct communication, the D2D technology may be used for V2V/V2I service transmission.

In an existing LTE R12 D2D communications technology, if a terminal can find a cell on a D2D transmission carrier frequency of interest, it is considered that the terminal is within a network coverage area. Otherwise, it is considered that the terminal is beyond a network coverage area. The terminal within the network coverage area implements synchronization by using a synchronization signal of a base station. The terminal beyond the network coverage area needs to search for a surrounding synchronization source before performing D2D communication. If a synchronization source satisfying a signal quality requirement can be detected around, the terminal synchronizes with the synchronization source. Otherwise, the terminal serves as a synchronization source to determine a synchronization signal sending moment and send a synchronization signal at the corresponding moment. If a receiving terminal finds multiple synchronization sources, on the premise that the multiple synchronization sources satisfy the signal quality requirement, priorities for accessing different synchronization sources are distinguished as follows: A synchronization source within the network coverage area has priority over a synchronization source beyond the network coverage area.

In the prior art, when a terminal beyond a coverage area sends a synchronization signal as a synchronization source, different synchronization sources are probably asynchronized, and asynchronization between two synchronization sources causes asynchronization between receiving terminals covered by the two synchronization sources. Consequently, communication between the two receiving terminals is affected, and a problem of inability to communicate with each other or a miss in reception may occur, severely affecting communication performance.

SUMMARY

Embodiments of the present invention provide a synchronous communication method, so as to avoid resource allocation misalignment and a communication failure that are caused by asynchronization, and improve transmission performance.

In view of this, a first aspect of the embodiments of the present invention provides a synchronous communication method, including:

obtaining, by a first terminal, first configuration information, where the first configuration information includes a first parameter;

determining, by the first terminal according to a global navigation satellite system GNSS clock, a transmission timeslot corresponding to a current moment in a device-to-device D2D communications system;

determining, by the first terminal according to the transmission timeslot and the first parameter, whether the current moment is a synchronization information sending moment; and if the current moment is the synchronization information sending moment, sending, by the first terminal, sidelink synchronization information at the synchronization information sending moment, where the sidelink synchronization information carries indication information, the sidelink synchronization information is used to synchronize a second terminal with the first terminal, and the indication information is used to indicate, to the second terminal, that the first terminal is a synchronization source that uses the GNSS clock.

With reference to the first aspect of the present invention, in a first implementation of the first aspect of the present invention, the sidelink synchronization information includes a sidelink synchronization signal SLSS.

With reference to the first implementation of the first aspect of the present invention, in a second implementation of the first aspect of the present invention, the SLSS includes a primary sidelink synchronization signal PSSS and a secondary sidelink synchronization signal SSSS, the PSSS and/or the SSSS include/includes a dedicated sequence, and the dedicated sequence is the indication information.

With reference to the first implementation of the first aspect of the present invention, in a third implementation of the first aspect of the present invention, the SLSS includes a primary sidelink synchronization signal PSSS and a secondary sidelink synchronization signal SSSS; the PSSS includes a first dedicated sequence, and the first dedicated sequence is the indication information; the SSSS includes a second dedicated sequence, the second dedicated sequence includes target indication information, and the target indication information is used to indicate, to the second terminal, a priority of the first terminal in synchronization sources that use the GNSS clock.

With reference to the third implementation of the first aspect of the present invention, in a fourth implementation of the first aspect of the present invention, the target information includes a type of a GNSS technology used by the first terminal, or synchronization precision of the GNSS clock used by the first terminal, or a priority identifier.

With reference to the first aspect of the present invention, in a fifth implementation of the first aspect of the present invention, the sidelink information includes a sidelink master information block MIB-SL, and the MIB-SL includes the indication information.

With reference to the first aspect of the present invention, in a sixth implementation of the first aspect of the present invention, a priority of the synchronization source that uses the GNSS clock is higher than a priority of a synchronization source that does not use the GNSS clock; or a priority of the synchronization source that uses the GNSS clock is higher than a priority of a synchronization source beyond network coverage that does not use the GNSS clock; or a priority of the synchronization source that uses the GNSS clock is higher than a priority of a synchronization source beyond network coverage that does not use the GNSS clock and a priority of a cell within network coverage; or a priority of the synchronization source that uses the GNSS clock is higher than a priority of a synchronization source beyond network coverage that does not use the GNSS clock but lower than a priority of a cell within network coverage.

With reference to any one of the first aspect of the present invention or the first to the sixth implementations of the first aspect of the present invention, in a seventh implementation of the first aspect of the present invention, the corresponding transmission timeslot in the D2D communications system is a frame number and/or a subframe number.

With reference to any one of the first implementation to the fourth implementation of the first aspect of the present invention, in an eighth implementation of the first aspect of the embodiments of the present invention, the sidelink synchronization information further includes an MIB-SL, and the MIB-SL includes information about the transmission timeslot, to align timeslots of the second terminal and the first terminal.

With reference to any one of the first aspect of the present invention or the first to the sixth implementations of the first aspect of the present invention, in a ninth implementation of the first aspect of the present invention, before the determining, by the first terminal according to a global navigation satellite system GNSS clock, a transmission timeslot corresponding to a current moment in a device-to-device D2D communications system, the method includes:

obtaining, by the first terminal, second configuration information; and the determining, by the first terminal according to a global navigation satellite system GNSS clock, a transmission timeslot corresponding to a current moment in a device-to-device D2D communications system includes:

determining, by the first terminal according to the GNSS clock and the second configuration information, the transmission timeslot corresponding to the current moment in the D2D communications system.

With reference to the ninth implementation of the first aspect of the present invention, in a tenth implementation of the first aspect of the present invention, the obtaining, by the first terminal, second configuration information includes:

obtaining, by the first terminal, the second configuration information in a pre-configuration manner; or when the first terminal is within network coverage, obtaining, by the first terminal, the second configuration information by receiving system broadcast information sent by a base station; or when the first terminal is within network coverage, obtaining, by the first terminal, the second configuration information by receiving radio resource control RRC signaling sent by a base station; or obtaining, by the first terminal, the second configuration information according to a preset protocol.

With reference to the ninth implementation of the first aspect of the present invention, in an eleventh implementation of the first aspect of the present invention, the second configuration information includes a second parameter; and the determining, by the first terminal according to the GNSS clock and the second configuration information, the transmission timeslot corresponding to the current moment in the D2D communications system includes:

determining, by the first terminal, the current moment according to the GNSS clock; and calculating, by the first terminal, the transmission timeslot according to the current moment and the second parameter in accordance with a preset calculation rule.

With reference to the eleventh implementation of the first aspect of the present invention, in a twelfth implementation of the first aspect of the present invention, the second parameter includes an initial reference moment; and the calculating, by the first terminal, the transmission timeslot according to the current moment and the second parameter in accordance with a preset calculation rule includes:

calculating, by the first terminal, a difference between the current moment and the initial reference moment; and calculating, by the first terminal according to the preset calculation rule and the difference, a frame number and a subframe number that correspond to the current moment in the D2D communications system.

With reference to the twelfth implementation of the first aspect of the present invention, in a thirteenth implementation of the first aspect of the present invention, the first terminal calculates the frame number $DFN_t$ by using the following formula:

$$DFN_t = (a * T_{duration}) \bmod K_1, \text{ where}$$

$K_1$ is a length of a frame period, $T_{duration}$ is the difference, a is a first scale parameter, and the first scale parameter is used to align a time unit of the difference with a frame length unit.

With reference to the twelfth or the thirteenth implementation of the first aspect of the present invention, in a fourteenth implementation of the first aspect of the present invention, the first terminal calculates the subframe number $subframe_t$ by using the following formula:

$$subframe_t = (b * T_{duration}) \bmod K_2, \text{ where}$$

$K_2$ is a length of a subframe period, b is a second scale parameter, the second scale parameter is used to align the time unit of the difference with a subframe length unit, and $T_{duration}$ is the difference.

A second aspect of the embodiments of the present invention provides a synchronous communication method, including:

obtaining, by a second terminal, sidelink synchronization information sent by a first terminal, where the sidelink synchronization information carries indication information; and determining, by the second terminal according to the indication information, that the first terminal is a synchronization source that uses a GNSS clock, and synchronizing with the first terminal according to the sidelink synchronization information.

With reference to the second aspect of the present invention, in a first implementation of the second aspect of the present invention, the sidelink synchronization information includes a sidelink synchronization signal SLSS, and the SLSS includes a primary synchronization signal PSSS and a secondary synchronization signal SSSS; and the determining, by the second terminal according to the indication information, that the first terminal is a synchronization source that uses a GNSS clock includes:

parsing, by the second terminal, the PSSS and/or SSSS to obtain a dedicated sequence, where the dedicated sequence is used to indicate that the first terminal is the synchronization source that uses the GNSS clock; and determining, by the second terminal according to the dedicated sequence, that the first terminal is the synchronization source that uses the GNSS clock.

With reference to the second aspect of the present invention, in a second implementation of the second aspect of the present invention, the sidelink includes a sidelink synchronization signal SLSS, and the SLSS includes a primary synchronization signal PSSS and a secondary synchronization signal SSSS;

the determining, by the second terminal according to the indication information, that the first terminal is a synchronization source that uses a GNSS clock includes:

parsing, by the second terminal, the PSSS to obtain a first dedicated sequence, where the first dedicated sequence is used to indicate that the first terminal is the synchronization source that uses the GNSS clock; and determining, by the second terminal according to the first dedicated sequence, that the first terminal is the synchronization source that uses the GNSS clock; and the synchronizing, by the second terminal, with the first terminal according to the sidelink synchronization information includes:

when there are multiple first terminals, parsing, by the second terminal, the SSSS to obtain the second dedicated sequence, where the second dedicated sequence includes target indication information, and the target indication information is used to indicate a priority of the first terminal in synchronization sources that use the GNSS clock;

determining, by the second terminal, a synchronization source priority of each first terminal according to the second dedicated sequence; and synchronizing, by the second terminal, with a first terminal whose synchronization source priority is the highest in the multiple first terminals.

With reference to the second implementation of the second aspect of the present invention, in a third implementation of the second aspect of the present invention, the target information includes a type of a GNSS technology used by the first terminal, or synchronization precision of the GNSS clock used by the first terminal, or a priority identifier.

With reference to the second aspect of the present invention, in a fourth implementation of the second aspect of the present invention, the sidelink synchronization information includes a sidelink master information block MIB-SL; and the determining, by the second terminal according to the indication information, that the first terminal is a synchronization source that uses a GNSS clock includes:

parsing, by the second terminal, the MIB-SL to obtain the indication information, where the indication information is used to indicate that the first terminal is the synchronization source that uses the GNSS clock; and determining, by the second terminal according to the indication information, that the first terminal is the synchronization source that uses the GNSS clock.

With reference to the first implementation of the second aspect of the present invention, in a fifth implementation of the second aspect of the present invention, the sidelink synchronization information further includes an MIB-SL, and the MIB-SL includes a transmission timeslot that is determined by the first terminal according to the GNSS clock and that corresponds to a current moment in a D2D system; and the synchronizing, by the second terminal, with the first terminal according to the sidelink synchronization information sent by the first terminal includes:

obtaining, by the second terminal, a timeslot boundary of the first terminal according to the SLSS;

aligning, by the second terminal, a timeslot boundary of the second terminal with the timeslot boundary of the first terminal;

determining, by the second terminal according to the MIB-SL, the transmission timeslot that is determined by the first terminal according to the GNSS clock and that corresponds to the current moment in the device-to-device D2D system; and aligning, by the second terminal, a transmission timeslot of the second terminal with the transmission timeslot of the first terminal.

With reference to the fifth implementation of the second aspect of the present invention, in a sixth implementation of the second aspect of the present invention, the transmission timeslot is a subframe number and/or a frame number.

With reference to any one of the second aspect of the present invention or the first to the sixth implementations of the second aspect of the present invention, in a seventh implementation of the second aspect of the present invention, a priority of the synchronization source that uses the GNSS clock is higher than a priority of a synchronization source that does not use the GNSS clock; or a priority of the synchronization source that uses the GNSS clock is higher than a priority of a synchronization source beyond network coverage that does not use the GNSS clock; or a priority of the synchronization source that uses the GNSS clock is higher than a priority of a synchronization source beyond network coverage that does not use the GNSS clock and a priority of a cell within network coverage; or a priority of the synchronization source that uses the GNSS clock is higher than a priority of a synchronization source beyond network coverage that does not use the GNSS clock but lower than a priority of a cell within network coverage.

A third aspect of the embodiments of the present invention provides a terminal, including:

an obtaining module, configured to obtain first configuration information, where the first configuration information includes a first parameter;

a determining module, configured to determine, according to a global navigation satellite system GNSS clock, a transmission timeslot corresponding to a current moment in a device-to-device D2D communications system;

a judging module, configured to determine, according to the transmission timeslot determined by the determining module and the first parameter obtained by the obtaining module, whether the current moment is a synchronization information sending moment; and a sending module, configured to: when the judging module determines that the current moment is the synchronization information sending moment, send sidelink synchronization information at the synchronization information sending moment, where the sidelink synchronization information carries indication information, the sidelink synchronization information is used to synchronize a second terminal with the first terminal, and the indication information is used to indicate, to the second terminal, that the first terminal is a synchronization source that uses the GNSS clock.

With reference to the first aspect of the present invention, in a first implementation of the first aspect of the present invention, the obtaining module is further configured to obtain second configuration information; and the determining module is further configured to determine, according to the GNSS clock and the second configuration information that is obtained by the obtaining module, the transmission timeslot corresponding to the current moment in the D2D communications system.

With reference to the first implementation of the third aspect of the present invention, in a second implementation of the third aspect of the present invention, the obtaining module is further configured to obtain the second configuration information in a pre-configuration manner; or the obtaining module is further configured to: when the first terminal is within network coverage, obtain the second configuration information by receiving system broadcast information sent by a base station; or the obtaining module is further configured to: when the first terminal is within network coverage, obtain the second configuration information by receiving RRC signaling sent by a base station; or the obtaining module is further configured to obtain the second configuration information according to a preset protocol.

With reference to the first implementation or the second implementation of the third aspect of the present invention, in a third implementation of the third aspect of the present invention, the second configuration information includes a second parameter;

the determining module is further configured to determine the current moment according to the GNSS clock; and the determining module is further configured to calculate the transmission timeslot according to the current moment and the second parameter in accordance with a preset calculation rule.

With reference to the third implementation of the third aspect of the present invention, in a fourth implementation of the third aspect of the present invention, the second parameter includes an initial reference moment;

the determining module is further configured to calculate a difference between the current moment and the initial reference moment; and the determining module is further configured to calculate, according to the preset calculation rule and the difference, a frame number and a subframe number that correspond to the current moment in the D2D communications system.

A fourth aspect of the embodiments of the present invention provides another terminal, including:

an obtaining module, configured to obtain sidelink synchronization information sent by a first terminal, where the sidelink synchronization information carries indication information;

a determining module, configured to determine, according to the indication information obtained by the obtaining module, that the first terminal is a synchronization source that uses a GNSS clock; and a synchronization module, configured to synchronize the terminal with the first terminal according to the sidelink synchronization information.

With reference to the fourth aspect of the present invention, in a first implementation of the fourth aspect of the present invention, the sidelink synchronization information includes a sidelink synchronization signal SLSS, and the SLSS includes a primary synchronization signal PSSS and a secondary synchronization signal SSSS;

the determining module is further configured to parse the PSSS and/or the SSSS to obtain a dedicated sequence, where the dedicated sequence is used to indicate that the first terminal is the synchronization source that uses the GNSS clock; and the determining module is further configured to determine, according to the dedicated sequence, that the first terminal is the synchronization source that uses the GNSS clock.

With reference to the fourth aspect of the present invention, in the first implementation of the fourth aspect of the present invention, the sidelink includes a sidelink synchronization signal SLSS, and the SLSS includes a primary synchronization signal PSSS and a secondary synchronization signal SSSS;

the determining module is further configured to parse the PSSS to obtain a first dedicated sequence, where the first dedicated sequence is used to indicate that the first terminal is the synchronization source that uses the GNSS clock;

the determining module is further configured to determine, according to the first dedicated sequence, that the first terminal is the synchronization source that uses the GNSS clock;

the synchronization module is further configured to: when there are multiple first terminals, parse the SSSS to obtain the second dedicated sequence, where the second dedicated sequence includes target indication information, and the target indication information is used to indicate a priority of the first terminal in synchronization sources that use the GNSS clock;

the synchronization module is further configured to determine a synchronization source priority of each first terminal according to the second dedicated sequence; and the synchronization module is further configured to synchronize the terminal with a first terminal whose synchronization source priority is the highest in the multiple first terminals.

With reference to the fourth aspect of the present invention, in a third implementation of the fourth aspect of the present invention, the sidelink synchronization information includes a sidelink master information block MIB-SL;

the determining module is further configured to parse the MIB-SL to obtain the indication information, where the indication information is used to indicate that the first terminal is the synchronization source that uses the GNSS clock; and the determining module is further configured to determine, according to the indication information, that the first terminal is the synchronization source that uses the GNSS clock.

With reference to the first implementation of the fourth aspect of the present invention, in a fourth implementation of the fourth aspect of the present invention, the sidelink synchronization information further includes an MIB-SL, and the MIB-SL includes a transmission timeslot that is determined by the first terminal according to the GNSS clock and that corresponds to a current moment in a D2D system;

the synchronization module is further configured to obtain a timeslot boundary of the first terminal according to the SLSS;

the synchronization module is further configured to align a timeslot boundary of the terminal with the timeslot boundary of the first terminal;

the synchronization module is further configured to determine, according to the MIB-SL, the transmission timeslot that is determined by the first terminal according to the GNSS clock and that corresponds to the current moment in the device-to-device D2D system; and the synchronization module is further configured to align a transmission timeslot of the terminal with the transmission timeslot of the first terminal.

A fifth aspect of the present invention provides a terminal, including: a radio frequency module, a processor, and a memory, where the processor is configured to perform the following procedure:

determining, according to a GNSS clock, a transmission timeslot corresponding to a current moment in a D2D system; and determining, according to the transmission timeslot and the first parameter, whether the current moment is a synchronization information sending moment; and the radio frequency module is configured to perform the following procedure:

obtaining first configuration information, where the first configuration information includes the first parameter; and when the processor determines that the current moment is the synchronization information sending moment, sending sidelink synchronization information at the synchronization information sending moment, where the sidelink synchronization information carries indication information, the sidelink synchronization information is used to synchronize a second terminal with the first terminal, and the indication information is used to indicate, to the second terminal, that the first terminal is a synchronization source that uses the GNSS clock.

With reference to the fifth aspect of the present invention, in a first implementation of the fifth aspect of the present invention, the radio frequency module is further configured to perform the following procedure:

obtaining second configuration information; and determining, according to the GNSS clock and the second configuration information, the transmission timeslot corresponding to the current moment in the D2D communications system.

With reference to the first implementation of the fifth aspect of the present invention, in a second implementation of the fifth aspect of the present invention, the processor specifically performs the following procedure:

obtaining the second configuration information in a pre-configuration manner; or obtaining the second configuration information according to a preset protocol; or the radio frequency module specifically performs the following procedure:

when the first terminal is within network coverage, obtaining the second configuration information by receiving system broadcast information sent by a base station; or when the first terminal is within network coverage, obtaining the second configuration information by receiving RRC signaling sent by a base station.

With reference to the first or the second implementation of the fifth aspect of the present invention, in a third implementation of the fifth aspect of the present invention, the second configuration information includes a second parameter; and the processor specifically performs the following procedure:

determining the current moment according to the GNSS clock; and calculating the transmission timeslot according to the current moment and the second parameter in accordance with a preset calculation rule.

With reference to the third implementation of the fifth aspect of the present invention, in a fourth implementation of the embodiments of the present invention, the second parameter includes an initial reference moment; and the processor specifically performs the following procedure:

calculating a difference between the current moment and the initial reference moment; and calculating, according to the preset calculation rule and the difference, a frame number and a subframe number that correspond to the current moment in the D2D communications system.

A sixth aspect of the embodiments of the present invention provides a terminal, including: a radio frequency module, a processor, and a memory, where the radio frequency module performs the following procedure:

obtaining sidelink synchronization information sent by a first terminal, where the sidelink synchronization information carries indication information; and the processor performs the following procedure:

obtaining the sidelink synchronization information sent by the first terminal, where the sidelink synchronization information carries the indication information; and synchronizing the terminal with the first terminal according to the sidelink synchronization information.

With reference to the sixth aspect of the embodiments of the present invention, in a first implementation of the sixth aspect of the present invention, the sidelink synchronization information includes a sidelink synchronization signal SLSS, and the SLSS includes a primary synchronization signal PSSS and a secondary synchronization signal SSSS; and the processor specifically performs the following procedure:

parsing the PSSS and/or the SSSS to obtain a dedicated sequence, where the dedicated sequence is used to indicate that the first terminal is a synchronization source that uses a GNSS clock; and determining, according to the dedicated sequence, that the first terminal is the synchronization source that uses the GNSS clock.

With reference to the sixth aspect of the present invention, in a second implementation of the sixth aspect of the present invention, the sidelink includes a sidelink synchronization signal SLSS, and the SLSS includes a primary synchronization signal PSSS and a secondary synchronization signal SSSS; and the processor specifically performs the following procedure:

parsing the PSSS to obtain a first dedicated sequence, where the first dedicated sequence is used to indicate that the first terminal is the synchronization source that uses the GNSS clock;

determining, according to the first dedicated sequence, that the first terminal is the synchronization source that uses the GNSS clock;

when there are multiple first terminals, parsing the SSSS to obtain the second dedicated sequence, where the second dedicated sequence includes target indication information, and the target indication information is used to indicate a priority of the first terminal in synchronization sources that use the GNSS clock;

determining a synchronization source priority of each first terminal according to the second dedicated sequence; and synchronizing the terminal with a first terminal whose synchronization source priority is the highest in the multiple first terminals.

With reference to the sixth aspect of the present invention, in a third implementation of the sixth aspect of the present invention, the sidelink synchronization information includes a sidelink master information block MIB-SL; and the processor specifically performs the following procedure:

parsing the MIB-SL to obtain the indication information, where the indication information is used to indicate that the first terminal is the synchronization source that uses the GNSS clock; and determining, according to the indication information, that the first terminal is the synchronization source that uses the GNSS clock.

With reference to the first implementation of the sixth aspect of the present invention, in a fourth implementation of the sixth aspect of the present invention, the sidelink synchronization information further includes an MIB-SL, and the MIB-SL includes a transmission timeslot that is determined by the first terminal according to the GNSS clock and that corresponds to a current moment in a D2D system; and the processor is further configured to perform the following procedure:

obtaining a timeslot boundary of the first terminal according to the SLSS;

aligning a timeslot boundary of the terminal with the timeslot boundary of the first terminal;

determining, according to the MIB-SL, the transmission timeslot that is determined by the first terminal according to the GNSS clock and that corresponds to the current moment in the D2D system; and aligning a transmission timeslot of the second terminal with the transmission timeslot of the first terminal.

It can be learned from the foregoing technical solutions that, the embodiments of the present invention have the following advantages:

In the embodiments of the present invention, the first terminal can determine, according to the global navigation satellite system (GNSS) clock, the transmission timeslot corresponding to the current moment in the D2D communications system, and determine, according to the transmission timeslot and the first parameter, whether the current moment is a synchronization information sending moment, and if the current moment is the synchronization information sending moment, the first terminal sends the sidelink synchronization information at the synchronization information sending moment. The sidelink synchronization information carries the indication information, the sidelink synchronization information is used to synchronize the second terminal with the first terminal, and the indication information is used to indicate, to the second terminal, that the first terminal is the synchronization source that uses the GNSS clock. Because the GNSS clock has uniform timing and high precision, transmission timeslots determined by different terminals by using the GNSS clock are consistent, and sending moments are also consistent. Therefore, the second terminal that accesses this type of synchronization source can also be synchronized, thereby avoiding resource allocation misalignment and a communication failure that are caused by asynchronization, and improving transmission performance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Figure 1:
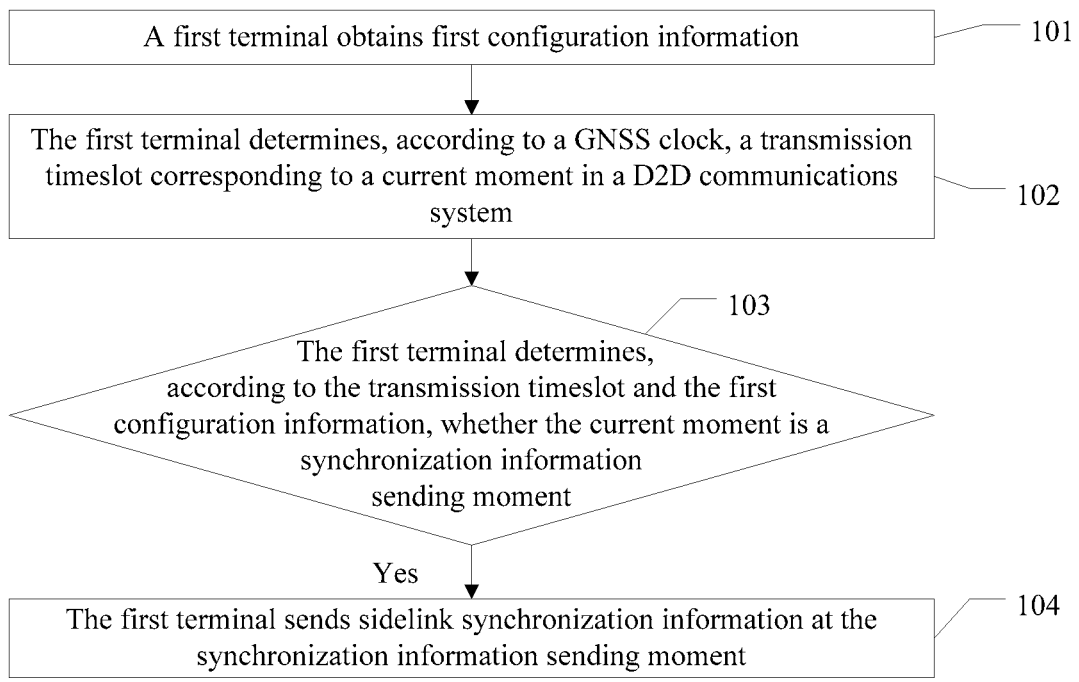
FIG. 1 is a schematic diagram of an embodiment of a synchronous communication method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include", "contain" and any other variants mean to cover the non-exclusive inclusion. For example, a process, method, system, product, or device that includes a series of steps or units is not necessarily limited to those steps or units listed clearly, but may include other units not expressly listed or inherent to such a process, method, system, product, or device.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), or a Worldwide Interoperability for Microwave Access (WIMAX) communications system.

It should further be understood that in the embodiments of the present invention, a first terminal or a second terminal includes but is not limited to user equipment (UE), a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" telephone), or a computer having a wireless communication function. The user equipment may further be a portable, pocket-sized, handheld, computer built-in, or in-vehicle mobile apparatus.

In the embodiments of the present invention, a base station may be a base transceiver station (BTS) in GSM or CDMA, or may be a NodeB in WCDMA, or may be an evolved NodeB (eNB) in LTE. This is not limited in the embodiments of the present invention.

The embodiments of the present invention provide a synchronous communication method and a terminal, so as to avoid resource allocation misalignment and a communication failure that are caused by asynchronization, and improve transmission performance.

First, synchronous communication in the embodiments of the present invention is described below from the perspective of a first terminal. Referring to FIG. 1, an embodiment of synchronous communication in the embodiments of the present invention includes the following steps.

101. The first terminal obtains first configuration information.

The first terminal obtains the first configuration information. The first configuration information includes a first parameter, and the first parameter is used to determine whether a specific moment is a synchronization information sending moment. It should be noted that, the first terminal may obtain the first configuration information in a pre-configuration manner, or may obtain the second configuration information according to a preset protocol, or when the first terminal is within network coverage, may receive system broadcast information or radio resource control (RRC) signaling sent by a base station, and then obtain the first configuration information from the broadcast information or the RRC signaling. Alternatively, the first terminal may obtain the first configuration information in another manner. This is not specifically limited herein.

102. The first terminal determines, according to a GNSS clock, a transmission timeslot corresponding to a current moment in a D2D communications system.

When the first terminal needs to perform D2D communication with another terminal as a synchronization source, the first terminal determines, according to the GNSS clock, the transmission timeslot corresponding to the current moment in the D2D communications system.

It should be noted that, a GNSS is a generic term for all navigation satellite systems, including global, regional, and augmented ones, for example, the Global Positioning System (GPS) of America, the GLONASS navigation satellite system of Russia, the Galileo satellite positioning system of Europe, the BeiDou Navigation Satellite System of China, and related augmented systems, such as the wide area augmentation system (WAAS) of America, the European Geostationary Navigation Overlay System of Europe, and the Multi-functional Satellite Augmentation System (MSAS) of Japan, and further including other navigation satellite systems that are being built and to be built in the future.

103. The first terminal determines, according to the transmission timeslot and a first parameter, whether the current moment is a synchronization information sending moment; and if the current moment is the synchronization information sending moment, step 104 is performed.

After determining the transmission timeslot corresponding to the current moment in the D2D communications system, the first terminal determines, according to the transmission timeslot and the first parameter, whether the current moment is the synchronization information sending moment. If the current moment is the synchronization information sending moment, step 104 is performed.

104. The first terminal sends sidelink synchronization information at the synchronization information sending moment.

When the first terminal determines that the current moment is the synchronization information sending moment, the first terminal sends the sidelink synchronization information at the synchronization information sending moment. The sidelink synchronization information carries indication information, the sidelink synchronization information is used to synchronize a second terminal with the first terminal, and the indication information is used to indicate, to the second terminal, that the first terminal is a synchronization source that uses the GNSS clock.

In this embodiment of the present invention, the first terminal can determine, according to the GNSS clock, the transmission timeslot corresponding to the current moment in the D2D communications system, and determine, according to the transmission timeslot and the first parameter, whether the current moment is the synchronization information sending moment; and if the current moment is the synchronization information sending moment, the first terminal sends the sidelink synchronization information at the synchronization information sending moment. The sidelink synchronization information carries the indication information, the sidelink synchronization information is used to synchronize the second terminal with the first terminal, and the indication information is used to indicate, to the second terminal, that the first terminal is the synchronization source that uses the GNSS clock. Because the GNSS clock has uniform timing and high precision, transmission timeslots determined by different terminals by using the GNSS clock are consistent, and sending moments are also consistent.

Therefore, the second terminal that accesses this type of synchronization source can also be synchronized, thereby avoiding resource allocation misalignment and a communication failure that are caused by asynchronization, and improving transmission performance.

Figure 2:
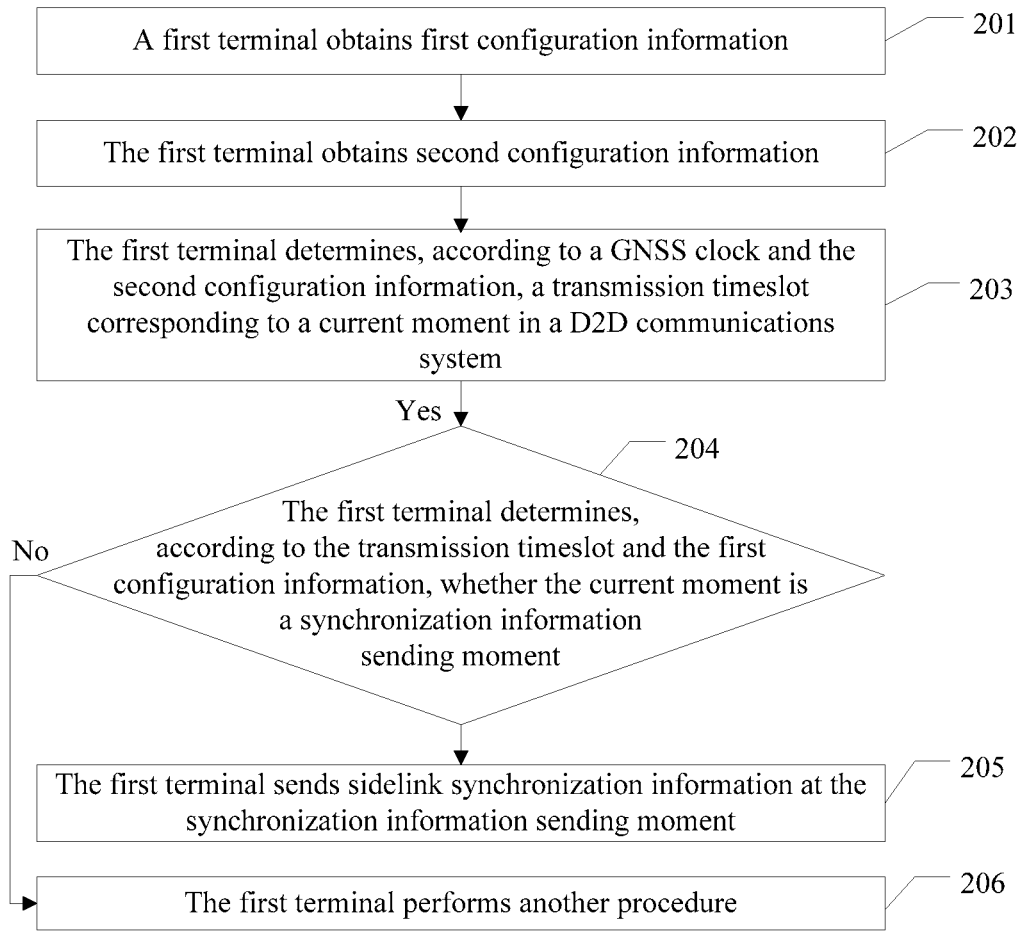
FIG. 2 is a schematic diagram of another embodiment of a synchronous communication method according to an embodiment of the present invention.

For ease of understanding, the synchronous communication method on the first terminal side in the embodiments of the present invention is described below in detail. Referring to FIG. 2, another embodiment of the synchronous communication method in the embodiments of the present invention includes the following steps.

201. A first terminal obtains first configuration information.

The first terminal obtains the first configuration information. The first configuration information includes a first parameter, and the first parameter is used to determine whether a specific moment is a synchronization information sending moment. It should be noted that, the first terminal may obtain the first configuration information in a pre-configuration manner, or may obtain the first configuration information according to a preset protocol, or when the first terminal is within network coverage, may receive system broadcast information or RRC signaling sent by a base station, and then obtain the first configuration information from the broadcast information or the RRC signaling. Alternatively, the first terminal may obtain the first configuration information in another manner. This is not specifically limited herein.

It should be further noted that, the first configuration information may further include a determining rule for determining whether a moment is a synchronization information sending moment, and may further include other information. This is not specifically limited herein.

202. The first terminal obtains second configuration information.

The first terminal obtains the second configuration information. It should be noted that, the first terminal may obtain the second configuration information in a pre-configuration manner, or may obtain the second configuration information according to a preset protocol, or when the first terminal is within network coverage, may receive system broadcast information or RRC signaling sent by a base station, and then obtain the second configuration information from the broadcast information or the RRC signaling. Alternatively, the first terminal may obtain the second configuration information in another manner. This is not specifically limited herein.

It should be further noted that, the second configuration information may further include a calculation rule for calculating a current timeslot or include a second parameter, and may further include other information. This is not specifically limited herein.

203. The first terminal determines, according to a GNSS clock and the second configuration information, a transmission timeslot corresponding to a current moment in a D2D communications system.

After the first terminal obtains the second configuration information, when the first terminal needs to perform D2D communication with another terminal as a synchronization source, the first terminal determines, according to the GNSS clock and the second configuration information, the transmission timeslot corresponding to the current moment in the D2D communications system.

It should be noted that, the transmission timeslot may be a frame number, may be a subframe number, may be a frame number and a subframe number, or may be other information. This is not specifically limited herein.

If the second configuration information includes the second parameter, the first terminal determines, in the following manner, the transmission timeslot corresponding to the current moment in the D2D communications system:

determining, by the first terminal, the current moment according to the GNSS clock, and then calculating the transmission timeslot according to the current moment and the second parameter in accordance with a preset calculation rule.

A manner in which the first terminal calculates the transmission timeslot varies according to the second parameter. In the following description, for example, the second parameter includes an initial reference moment. When the second parameter includes the initial reference moment, the first terminal may calculate the transmission timeslot in accordance with the preset calculation rule in the following manner:

calculating, by the first terminal, a difference between the current moment and the initial reference moment, and calculating, according to the difference, a frame number and a subframe number that correspond to the current moment in the D2D communications system.

Specifically, according to the difference, the first terminal may calculate the frame number $DFN_t$ by using formula (1), and calculate the subframe number $subframe_t$ by using formula (2):

$$DFN_t = (a*T_{duration}) \bmod K_1 \qquad (1); \text{ and}$$

$$subframe_t = (b*T_{duration}) \bmod K_2 \qquad (2); \text{ where}$$

$K_1$ is a length of a frame period, $T_{duration}$ is the difference, a is a first scale parameter, the first scale parameter is used to align a time unit of the difference with a frame length unit, $K_2$ is a length of a subframe period, b is a second scale parameter, and the second scale parameter is used to align the time unit of the difference with a subframe length unit.

It should be noted that, the second configuration information may also include the calculation rule for calculating the transmission timeslot, and may further include other information. This is not specifically limited herein. When the second configuration information includes the calculation rule, the first terminal may calculate the transmission timeslot according to the current moment and the second parameter and according to the calculation rule included in the second configuration information. Alternatively, the first terminal may calculate the transmission timeslot according to another manner. This is not specifically limited herein.

204. The first terminal determines, according to the transmission timeslot and first parameter information, whether the current moment is a synchronization information sending moment; and if the current moment is the synchronization information sending moment, step 205 is performed; or if the current moment is not the synchronization information sending moment, step 206 is performed.

After determining the transmission timeslot corresponding to the current moment in the D2D communications system, the first terminal determines, according to the transmission timeslot and the first parameter, whether the current moment is the synchronization information sending moment. If the current moment is the synchronization information sending moment, step 204 is performed. Specifically, the first terminal may determine, according to the first parameter and according to a determining rule, whether the transmission timeslot satisfies a preset condition, and when the transmission timeslot satisfies the preset condition, the first terminal determines that the current moment is the synchronization information sending moment. Further, when the first parameter includes an offset, and the transmission timeslot is a frame number and a subframe number, the first terminal determines whether the frame number and the subframe number satisfy the following formula:

$$(c*DFN_t + subrame_t) \bmod K_3 = \text{syncOffseIndicator} \quad (3),\text{ where}$$

suframe$_t$ is the subframe number, DFN$_t$ is the frame number, c is a quantity of subframes included in one frame, K$_3$ is a synchronization sending period, and syncOffsetIndicato is the offset.

When the first terminal determines that the frame number and a subframe satisfy formula (3), the first terminal determines that the transmission timeslot satisfies the preset condition, and determines that the current moment is the synchronization information sending moment.

It should be noted that, the first terminal may also determine, according to another manner, whether the current moment is the synchronization information sending moment. This is not specifically limited herein.

205. The first terminal sends sidelink synchronization information at the synchronization information sending moment.

When the first terminal determines that the current moment is the synchronization information sending moment, the first terminal sends the sidelink synchronization information at the synchronization information sending moment. The sidelink synchronization information carries indication information, the sidelink synchronization information is used to synchronize a second terminal with the first terminal, and the indication information is used to indicate, to the second terminal, that the first terminal is a synchronization source that uses the GNSS clock.

It can be understood that, the sidelink synchronization information includes a sidelink synchronization signal (SLSS), the SLSS includes a primary synchronization signal (Primary Sidelink Synchronisation Signal, PSSS) and a secondary synchronization signal (Secondary Sidelink Synchronisation Signal, SSSS), and the indication information may be a dedicated sequence. The dedicated sequence may be included in the PSSS, or the dedicated sequence may be included in the SSSS; or one part of the dedicated sequence is included in the PSSS, the other part of the sequence is included in the SSSS, and sequence parts in the PSSS and the SSSS jointly form the dedicated sequence.

In addition to carrying the indication information, the sidelink synchronization information may further carry target indication information. The target indication information is used to indicate, to the second terminal, a priority of the first terminal in synchronization sources that use the GNSS clock. The indication information may be a first dedicated sequence that is included in the PSSS, and the target indication information may be a second dedicated sequence that is included in the SSSS. In this way, after determining, according to the indication information, that the first terminal is the synchronization source that uses the GNSS clock, the second terminal can further determine, according to the second dedicated sequence, the priority of the first terminal in the synchronization sources that use the GNSS clock. It should be noted that, the target information may include a type of a GNSS technology used by the first terminal, or precision of the GNSS clock used by the first terminal, or a priority identifier, and may further include other information. This is not specifically limited herein.

Based on the foregoing four cases, the sidelink synchronization information may further include a sidelink master information block (MasterInformationBlock-SL, MIB-SL), and the MIB-SL includes information about the transmission timeslot, so that the second terminal can determine the transmission timeslot according to the information about the transmission timeslot, and perform timeslot alignment with the first terminal according to the transmission timeslot.

Alternatively, the sidelink synchronization information includes an MIB-SL and an SLSS, and the MIB-SL includes the indication information. Optionally, the MIB-SL may further include information about the transmission timeslot, so that the second terminal can determine the transmission timeslot according to the information about the transmission timeslot, and perform timeslot alignment with the first terminal according to the transmission timeslot.

206. The first terminal performs another procedure.

When the first terminal determines that the current moment is the synchronization information sending moment, the first terminal performs another procedure. For example, the first terminal may return to step 203 to step 205 at a next moment.

It should be noted that, in this embodiment of the present invention, a priority of a synchronization source is preset by a base station, and in this embodiment of the present invention, a priority of a synchronization source that uses the GNSS clock may be higher than a priority of a synchronization source beyond network coverage that does not use the GNSS clock and a priority of a synchronization source within network coverage, or may be higher than only a priority of a synchronization source beyond network coverage that does not use the GNSS clock, or may be higher than a priority of a synchronization source beyond network coverage that does not use the GNSS clock but lower than a priority of a synchronization source within network coverage. The synchronization source within the network coverage may be a base station, or may be a terminal type synchronization source that does not use the GNSS clock. This is not specifically limited herein.

It should be further noted that, in this embodiment of the present invention, a sequence of step 202 and step 201 is not limited. Step 202 is performed before step 203, and may be performed before step 201 or after step 202. This is not specifically limited herein.

In this embodiment of the present invention, the first terminal can determine, according to the GNSS clock, the transmission timeslot corresponding to the current moment in the D2D communications system, and determine, according to the transmission timeslot and the first configuration information, whether the current moment is the synchronization information sending moment, and if the current moment is the synchronization information sending moment, the first terminal sends the sidelink synchronization information at the synchronization information sending moment. The sidelink synchronization information carries the indication information, the sidelink synchronization information is used to synchronize the second terminal with the first terminal, and the indication information is used to indicate, to the second terminal, that the first terminal is the synchronization source that uses the GNSS clock. Because the GNSS clock has uniform timing and high precision, transmission timeslots determined by different terminals by using the GNSS clock are consistent, and sending moments are also consistent. Therefore, the second terminal that accesses this type of synchronization source can also be synchronized, thereby avoiding resource allocation misalignment and a communication failure that are caused by asynchronization, and improving transmission performance.

In addition, in this embodiment of the present invention, the indication information may be carried in the sidelink synchronization information in multiple manners, and the terminal may determine, according to the GNSS clock in multiple manners, the transmission timeslot corresponding to the current moment in the D2D communications system, thereby improving flexibility of the solution.

Figure 3:
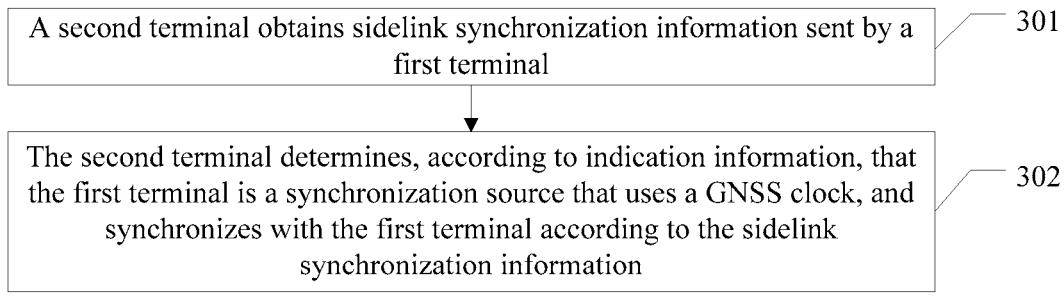
FIG. 3 is a schematic diagram of another embodiment of a synchronous communication method according to an embodiment of the present invention.

The foregoing describes the synchronous communication method in the embodiments of the present invention from the perspective of a first terminal, and the following describes the synchronous communication method in the embodiments of the present invention from the perspective of a second terminal. Referring to FIG. 3, another embodiment of the synchronous communication method in the embodiments of the present invention includes the following steps.

301. The second terminal obtains sidelink synchronization information sent by a first terminal.

The first terminal determines, according to a GNSS clock, a transmission timeslot corresponding to a current moment in a D2D communications system, determines, according to the transmission timeslot and first configuration information, that the current moment is a synchronization information sending moment, and sends the sidelink synchronization information at the synchronization information sending moment. The sidelink synchronization information carries indication information. In this case, the second terminal is around the first terminal, and needs to synchronize with a synchronization source. The second terminal finds the sidelink synchronization information sent by the first terminal, and obtains the sidelink synchronization information sent by the first terminal. The sidelink synchronization information carries the indication information.

302. The second terminal determines, according to indication information, that the first terminal is a synchronization source that uses a GNSS clock, and synchronizes with the first terminal according to the sidelink synchronization information.

After obtaining the sidelink synchronization information sent by the first terminal, the second terminal determines, according to the indication information carried in the sidelink synchronization information, that the first terminal is the synchronization source that uses the GNSS clock, and synchronizes with the first terminal according to the sidelink synchronization information.

In this embodiment of the present invention, the first terminal can determine, according to the global navigation satellite system GNSS clock, the transmission timeslot corresponding to the current moment in the D2D communications system, determine, according to the transmission timeslot and the first configuration information, that the current moment is the synchronization information sending moment, and send the sidelink synchronization information at the synchronization information sending moment. The sidelink synchronization information carries the indication information. The second terminal determines, according to the indication information, that the first terminal is the synchronization source that uses the GNSS clock, and synchronizes with the first terminal according to the sidelink synchronization information. Because the GNSS clock has uniform timing and high precision, transmission timeslots determined by different terminals by using the GNSS clock are consistent, and sending moments are also consistent. Therefore, the second terminal that accesses this type of synchronization source can also be synchronized, thereby avoiding resource allocation misalignment and a communication failure that are caused by asynchronization, and improving transmission performance.

Further referring to FIG. 3, in this embodiment of the present invention, the sidelink synchronization information includes an SLSS, and the SLSS includes a PSSS and an SSSS. The second terminal may determine, in the following manners, that the first terminal is the synchronization source that uses the GNSS clock:

1. The second terminal parses the PSSS to obtain a dedicated sequence. The dedicated sequence is used to indicate that the first terminal is the synchronization source that uses the GNSS clock. The second terminal determines, according to the dedicated sequence, that the first terminal is the synchronization source that uses the GNSS clock.

2. The second terminal parses the SSSS to obtain a dedicated sequence. The dedicated sequence is used to indicate that the first terminal is the synchronization source that uses the GNSS clock. The second terminal determines, according to the dedicated sequence, that the first terminal is the synchronization source that uses the GNSS clock.

3. The second terminal parses the PSSS to obtain a first sequence part, and parses the SSSS to obtain a second sequence part. The second terminal combines the first sequence part and the second sequence part to obtain a dedicated sequence. The dedicated sequence is used to indicate that the first terminal is the synchronization source that uses the GNSS clock. The second terminal determines, according to the dedicated sequence, that the first terminal is the synchronization source that uses the GNSS clock.

It can be understood that, the sidelink synchronization information may further include an MIB-SL, the MIB-SL includes information about the transmission timeslot, and the information about the transmission timeslot is used to indicate the transmission timeslot that is determined by the first terminal according to a GNSS and that corresponds to the current moment in the D2D system. The transmission timeslot may be a subframe number, may be a frame number, or may be a frame number and a subframe number.

The second terminal may synchronize with the first terminal in the following manner according to the sidelink synchronization information sent by the first terminal:

obtaining, by the second terminal, a timeslot boundary of the first terminal according to the SLS S; aligning, by the second terminal, a timeslot boundary of the second terminal with the timeslot boundary of the first terminal; determining, by the second terminal according to the MIB-SL, the transmission timeslot corresponding to the current moment in the D2D system; and aligning, by the second terminal, a transmission timeslot of the second terminal with the transmission timeslot of the first terminal.

It should be noted that, in this embodiment of the present invention, a priority of a synchronization source that uses the GNSS clock may be higher than a priority of a synchronization source beyond network coverage that does not use the GNSS clock and a priority of a synchronization source within network coverage, or may be higher than only a priority of a synchronization source beyond network coverage that does not use the GNSS clock, or may be higher than a priority of a synchronization source beyond network coverage that does not use the GNSS clock but lower than a priority of a synchronization source within network coverage. The synchronization source within the network coverage may be a base station, or may be a terminal type synchronization source that does not use the GNSS clock. This is not specifically limited herein. When the second terminal finds multiple synchronization sources, on the premise that the multiple synchronization sources satisfy a signal quality requirement, the second terminal preferentially accesses a synchronization source whose priority is higher.

In this embodiment of the present invention, the second terminal may determine, in multiple manners, that the first terminal is the synchronization source that uses the GNSS clock.

In addition, this embodiment of the present invention provides a specific manner in which the second terminal synchronizes with the first terminal according to the sidelink synchronization information sent by the first terminal, thereby improving implementability of the solution.

Further referring to FIG. 3, in this embodiment of the present invention, the sidelink synchronization information includes an SLSS, and the SLSS includes a PSSS and an SSSS. The second terminal may determine, in the following manner, that the first terminal is the synchronization source that uses the GNSS clock:

parsing, by the second terminal, the PSSS to obtain a first dedicated sequence, where the first dedicated sequence is used to indicate that the first terminal is the synchronization source that uses the GNSS clock; and determining, by the first terminal according to the first dedicated sequence, that the first terminal is the synchronization source that uses the GNSS clock.

In this case, the second terminal may synchronize with the first terminal according to the sidelink synchronization information in the following manner:

when there are multiple first terminals, parsing, by the second terminal, the SSSS to obtain a second dedicated sequence, where the second dedicated sequence includes target indication information, and the target indication information is used to indicate a priority of the first terminal in synchronization sources that use the GNSS clock;

determining, by the second terminal, a synchronization source priority of each first terminal according to the second dedicated sequence of the terminal; and synchronizing, by the second terminal, with a first terminal whose synchronization source priority is the highest in the multiple first terminals.

It should be noted that, the target indication information may include a type of a GNSS technology used by the first terminal, or synchronization precision of the GNSS clock used by the first terminal, or a priority identifier of the first terminal.

Specifically, the second terminal determines the synchronization source priority of the first terminal according to a GNSS type and a preset priority rule. For example, the preset priority rule is that the BeiDou Navigation Satellite System of China has a priority over the GPS of America. When the second terminal finds two first terminals, a second dedicated sequence of one first terminal indicates that a type of a GNSS technology used by the first terminal is BeiDou of China, and a second dedicated sequence of the other first terminal indicates that a type of a GNSS technology used by the first terminal is the GPS of America, the second terminal chooses to synchronize with the first terminal whose GNSS type is BeiDou of China.

Alternatively, the second terminal determines the synchronization source priority of the first terminal according to a GNSS type and a preset priority rule. For example, the preset priority rule is that a synchronization source with higher synchronization precision has a higher priority. When the second terminal finds two first terminals, a second dedicated sequence of one first terminal indicates that the first terminal has synchronization precision of 0.2, and a second dedicated sequence of the other first terminal indicates that the first terminal has synchronization precision of 0.1, the second terminal chooses to synchronize with the first terminal that has the synchronization precision of 0.1.

Alternatively, the second terminal determines the synchronization source priority of the first terminal according to a GNSS type and a preset priority rule. For example, the preset priority rule is that the BeiDou Navigation Satellite System of China has a priority over the GPS of America, and a synchronization source with higher synchronization precision has a higher priority when a same GNSS technology is used. When the second terminal finds three first terminals, a second dedicated sequence of a first terminal 1 indicates that a type of a GNSS technology used by the first terminal is the GPS of America, and that synchronization precision is 0.1; a second dedicated sequence of a first terminal 2 indicates that a type of a GNSS technology used by the first terminal is BeiDou of China, and that synchronization precision is 0.2; and a second dedicated sequence of a first terminal 3 indicates that a type of a GNSS technology used by the first terminal is BeiDou of China, and that synchronization precision is 0.1, the second terminal chooses to synchronize with the first terminal 3.

Alternatively, the second terminal determines the synchronization source priority of the first terminal according to the priority identifier. When the first terminal finds two first terminals, a second dedicated sequence of one first terminal indicates that the first terminal has a priority of 1, and a second dedicated sequence of the other first terminal indicates that the first terminal has a priority of 2, the second terminal chooses to synchronize with the first terminal that has the priority of 2.

It should be noted that, in this embodiment of the present invention, a priority of a synchronization source that uses the GNSS clock may be higher than a priority of a synchronization source beyond network coverage that does not use the GNSS clock and a priority of a synchronization source within network coverage, or may be higher than only a priority of a synchronization source beyond network coverage that does not use the GNSS clock, or may be higher than a priority of a synchronization source beyond network coverage that does not use the GNSS clock but lower than a priority of a synchronization source within network coverage. The synchronization source within the network coverage may be a base station, or may be a terminal type synchronization source that does not use the GNSS clock. This is not specifically limited herein. When the second terminal finds multiple synchronization sources, on the premise that the multiple synchronization sources satisfy a signal quality requirement, the second terminal preferentially accesses a synchronization source whose priority is higher.

In this embodiment of the present invention, when there are multiple first terminals, the second terminal may determine a priority of each first terminal according to the second dedicated sequence of the first terminal, and choose to synchronize with a first terminal whose priority is the highest, thereby improving flexibility of the solution.

Further referring to FIG. 3, in this embodiment of the present invention, the sidelink synchronization information includes an MIB-SL. The second terminal may determine, in the following manner, that the first terminal is the synchronization source that uses the GNSS clock:

parsing, by the second terminal, the MIB-SL to obtain the indication information, where the indication information is used to indicate that the first terminal is the synchronization source that uses the GNSS clock; and determining, by the second terminal according to the indication information, that the first terminal is the synchronization source that uses the GNSS clock.

Optionally, the MIB-SL may further include information about the transmission timeslot, and the information about the transmission timeslot is used to indicate the transmission timeslot that is determined by the first terminal according to a GNSS and that corresponds to the current moment in the D2D system. The transmission timeslot may be a subframe number, may be a frame number, or may be a frame number and a subframe number. The first terminal may implement timeslot alignment with the second terminal according to the transmission timeslot.

It should be noted that, in this embodiment of the present invention, a priority of a synchronization source that uses the GNSS clock may be higher than a priority of a synchronization source beyond network coverage that does not use the GNSS clock and a priority of a synchronization source within network coverage, or may be higher than only a priority of a synchronization source beyond network coverage that does not use the GNSS clock, or may be higher than a priority of a synchronization source beyond network coverage that does not use the GNSS clock but lower than a priority of a synchronization source within network coverage. The synchronization source within the network coverage may be a base station, or may be a terminal type synchronization source that does not use the GNSS clock. This is not specifically limited herein. When the second terminal finds multiple synchronization sources, on the premise that the multiple synchronization sources satisfy a signal quality requirement, the second terminal preferentially accesses a synchronization source whose priority is higher.

In this embodiment of the present invention, the second terminal can obtain the indication information by using the MIB-SL, thereby improving flexibility of the solution.

For ease of understanding, the following describes in detail the synchronous communication method in this embodiment of the present invention by using an actual application scenario:

A vehicle A is a vehicle that uses the BeiDou positioning system of China and that can perform vehicle-to-vehicle communication. When the vehicle A is beyond a network coverage area, the vehicle A obtains first configuration information and second configuration information that are pre-configured. The second configuration information includes an initial reference moment (a second parameter) $T_{ref}$: Jan. 1, 2015 00:00:00. The first configuration information includes an offset (a first parameter) and a determining rule for determining whether a current moment is a synchronization information sending moment. The offset is syncOffsetIndicato=0 and the determining rule is determining whether a subframe number $DFN_t$ and a subframe number $subframe_t$ that correspond to a current timeslot satisfy the following formula:

$$(c*DFN_t + subframe_t) \bmod K_3 = \text{syncOffsetIndicator},$$
where $subframe_t$, $DFN_t$ is the subframe number, is the frame number, c is a quantity of subframes included in one frame, $K_3$ is a synchronization sending period, and syncOffsetIndicato is the offset.

When the vehicle A needs to perform D2D communication, the vehicle A first searches for a synchronization source around, and finally finds no synchronization source. Then the vehicle A needs to serve as a synchronization source and send synchronization information. First, the vehicle A determines, according to a GNSS clock, that the current moment is Jan. 1, 2015-00:02:00. The vehicle A calculates a difference $T_{duration}$ between the current moment and the initial reference moment, and determines, according to $T_{duration} = T - T_{ref}$, that duration is 120 seconds. In addition, it is known that a frame length is 10 milliseconds, each frame includes 10 subframes (that is, a subframe length is 1 millisecond), 1024 frames form one period, and a synchronization signal is sent once every 10 subframes. That is, a frame period length is $K_1 = 1024$, a subframe period length is $K_2 = 10$, a synchronization sending period is $K_3 = 10$ a first scale parameter used to align a time unit of the difference with a frame length unit is $\alpha = 100$, a quantity of subframes included in one frame is c=10, and a second scale parameter used to align the time unit of the difference with a subframe length unit is b=1000.

Then the vehicle A calculates the frame number $DFN_t$ and the subframe number $subframe_t$ according to the following preset formulas:

$$DFN_t = (a*T_{duration}) \bmod K_1 = (100*120) \bmod 1024 = 736; \text{ and}$$

$$subframe_t = (b*T_{duration}) \bmod K_2 = (1000*120) \bmod 10 = 10$$

After obtaining the frame number and the subframe number by means of calculation, the vehicle A determines, according to the determining rule in the second configuration information, whether the current moment is the synchronization information sending moment:

$$(c*DFN_t + subframe_t) \bmod K_3 = (10*736 + 10) \bmod 10 = 0 = \text{syncOffsetIndicator}$$

Therefore, the vehicle A determines that the current moment is the synchronization information sending moment, and the vehicle A sends sidelink synchronization information at the synchronization information sending moment, that is, Jan. 1, 2015 00:02:00. The sidelink synchronization information includes an SLSS and an MIB-SL. The SLSS includes a PSSS and an SSSS, the PSSS carries a dedicated sequence, and the dedicated sequence is used to indicate, to another device, that the vehicle A is a synchronization source that uses the GNSS clock. The MIB-SL carries information about a transmission timeslot, and the information about the transmission timeslot is $DFN_t = 736$ and $subframe_t = 10$.

In this case, a vehicle B is near the vehicle A, and the vehicle B also needs to perform D2D communication. The vehicle B first searches for a synchronization source around, and finds multiple synchronization sources, of which two synchronization sources: the vehicle A and a vehicle C satisfy a signal quality requirement. The vehicle B detects sidelink synchronization information, that is, SLSSs and MIB-SLs, sent by the vehicle B and the vehicle C. The vehicle B parses the PSSS of the SLSS of the vehicle A to obtain the dedicated sequence. The dedicated sequence is used to indicate, to another device, that the vehicle A is a synchronization source that uses the GNSS clock. The vehicle B parses a PSSS in the SLSS and the MIB-SL of the vehicle C and learns that the vehicle C is a synchronization source beyond network coverage. In addition, the vehicle B obtains no information indicating that the vehicle C is a synchronization source that uses the GNSS clock. The vehicle B determines that the vehicle C is a synchronization source beyond network coverage that does not use the GNSS clock. According to a preset priority rule, a priority of a synchronization source that uses the GNSS clock is higher than a priority of a synchronization source beyond network coverage that does not use the GNSS clock. Therefore, the vehicle B chooses to synchronize with the vehicle A. Specifically, the vehicle B obtains a timeslot boundary of the vehicle A according to the SLSS, aligns a timeslot boundary of the vehicle B with the timeslot boundary of the vehicle A, determines, according to the MIB-SL, that the vehicle A has a frame number of 736 and a subframe number of 10, and aligns a frame number and a subframe number of the vehicle B with the frame number and the subframe number. In this way, the vehicle B completes synchronization with the vehicle A.

Figure 4:
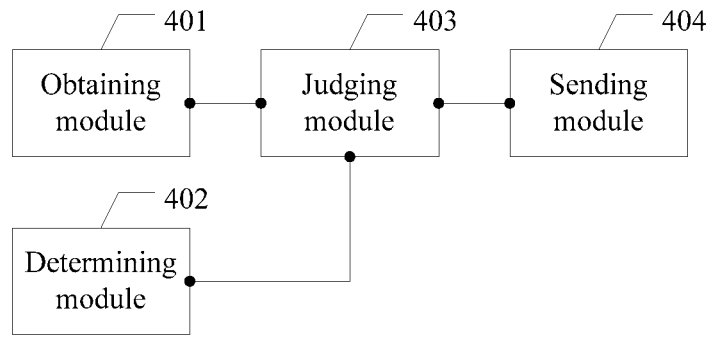
FIG. 4 is a schematic diagram of an embodiment of a terminal according to an embodiment of the present invention.

The foregoing describes the synchronous communication method in the embodiments of the present invention, and the following describes the terminal in the embodiments of the present invention. Referring to FIG. 4, an embodiment of the terminal in the embodiments of the present invention includes:

an obtaining module 401, configured to obtain first configuration information, where the first configuration information includes a first parameter;

a determining module 402, configured to determine, according to a GNSS clock, a transmission timeslot corresponding to a current moment in a D2D communications system;

a judging module 403, configured to determine, according to the transmission timeslot and the first parameter, whether the current moment is a synchronization information sending moment; and a sending module 404, configured to: when the judging module 403 determines that the current moment is the synchronization information sending moment, send sidelink synchronization information at the synchronization information sending moment, where the sidelink synchronization information carries indication information, the sidelink synchronization information is used to synchronize a second terminal with the first terminal, and the indication information is used to indicate, to the second terminal, that the first terminal is a synchronization source that uses the GNSS clock.

In this embodiment of the present invention, the determining module 402 can determine, according to the GNSS clock, the transmission timeslot corresponding to the current moment in the D2D communications system, the judging module 403 determines, according to the transmission timeslot and the first parameter, whether the current moment is the synchronization information sending moment, and if the current moment is the synchronization information sending moment, the sending module 404 sends the sidelink synchronization information at the synchronization information sending moment. The sidelink synchronization information carries the indication information, the sidelink synchronization information is used to synchronize the second terminal with the first terminal, and the indication information is used to indicate, to the second terminal, that the first terminal is the synchronization source that uses the GNSS clock. Because the GNSS clock has uniform timing and high precision, transmission timeslots determined by different terminals by using the GNSS clock are consistent, and sending moments are also consistent. Therefore, the second terminal that accesses this type of synchronization source can also be synchronized, thereby avoiding resource allocation misalignment and a communication failure that are caused by asynchronization, and improving transmission performance.

Based on the embodiment corresponding to FIG. 4, in another embodiment of the embodiments of the present invention, the obtaining module 401 is further configured to obtain second configuration information; and the determining module 402 is further configured to determine, according to the GNSS clock and the second configuration information that is obtained by the obtaining module 401, the transmission timeslot corresponding to the current moment in the D2D communications system.

Optionally, in this embodiment of the present invention, the second configuration information may include a second parameter.

The determining module 402 may be further configured to determine the current moment according to the GNSS clock, and calculate the transmission timeslot according to the current moment and the second parameter in accordance with a preset rule.

Optionally, in this embodiment of the present invention, the second parameter may include an initial reference moment.

The determining module 402 may be further configured to calculate a difference between the current moment and the initial reference moment, and calculate, according to the preset calculation rule and the difference, a frame number and a subframe number that correspond to the current moment in the D2D communications system.

In this embodiment of the present invention, a specific manner in which the determining module 402 determines the transmission timeslot improves implementability of the solution.

Optionally, in some other embodiments in the embodiments of the present invention, the obtaining module 401 may obtain the second configuration information in a pre-configuration manner; or when the first terminal is within network coverage, obtain the second configuration information by receiving system broadcast information sent by a base station; or when the first terminal is within network coverage, obtain the second configuration information by receiving RRC signaling sent by a base station; or obtain the second configuration information according to a preset protocol.

In this embodiment of the present invention, the obtaining module 401 can obtain the second configuration information in multiple manners, thereby improving flexibility of the solution.

Figure 5:
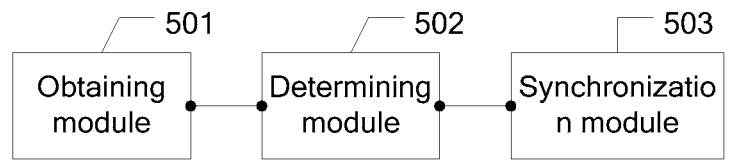
FIG. 5 is a schematic diagram of another embodiment of a terminal according to an embodiment of the present invention.

The foregoing describes the first terminal in the embodiments of the present invention, and the following describes a second terminal in the embodiments of the present invention. Referring to FIG. 5, another terminal in the embodiments of the present invention includes:

an obtaining module 501, configured to obtain sidelink synchronization information sent by a first terminal, where the sidelink synchronization information carries indication information;

a determining module 502, configured to determine, according to the indication information, that the first terminal is a synchronization source that uses a GNSS clock; and a synchronization module 503, configured to synchronize the terminal with the first terminal according to the sidelink synchronization information.

In this embodiment of the present invention, the first terminal can determine, according to the global navigation satellite system GNSS clock, the transmission timeslot corresponding to the current moment in the D2D communications system, determine, according to the transmission timeslot and the first configuration information, that the current moment is a synchronization information sending moment, and send the sidelink synchronization information at the synchronization information sending moment. The sidelink synchronization information carries the indication information. The determining module 602 of the second terminal determines, according to the indication information, that the first terminal is the synchronization source that uses the GNSS clock, and the synchronization module 603 synchronizes the second terminal with the first terminal according to the sidelink synchronization information. Because the GNSS clock has uniform timing and high precision, transmission timeslots determined by different terminals by using the GNSS clock are consistent, and sending moments are also consistent. Therefore, the second terminal that accesses this type of synchronization source can also be synchronized, thereby avoiding resource allocation misalignment and a communication failure that are caused by asynchronization, and improving transmission performance.

Based on the embodiment corresponding to FIG. 5, in this embodiment of the present invention, the sidelink synchronization information includes a sidelink synchronization signal SLSS, and the SLSS includes a primary synchronization signal PSSS and a secondary synchronization signal SSSS.

The determining module 502 is further configured to parse the PSSS and/or the SSSS to obtain a dedicated sequence, where the dedicated sequence is used to indicate that the first terminal is the synchronization source that uses the GNSS clock.

The determining module 502 is further configured to determine, according to the dedicated sequence, that the first terminal is the synchronization source that uses the GNSS clock.

Optionally, in this embodiment of the present invention, the sidelink synchronization information further includes an MIB-SL, and the MIB-SL includes a transmission timeslot that is determined by the first terminal according to the GNSS clock and that corresponds to a current moment in a D2D system.

The synchronization module 503 is further configured to obtain a timeslot boundary of the first terminal according to the SLSS, and align a timeslot boundary of the terminal with the timeslot boundary of the first terminal.

The synchronization module 503 is further configured to determine, according to the MIB-SL, the transmission timeslot that is determined by the first terminal according to the GNSS clock and that corresponds to the current moment in the D2D system, and align a transmission timeslot of the terminal with the transmission timeslot of the first terminal.

This embodiment of the present invention provides a specific manner in which the determining module 502 determines that the first terminal is the synchronization source that uses the GNSS clock and a specific manner in which the synchronization module 503 synchronizes the terminal with the first terminal according to the sidelink synchronization information, thereby improving implementability of the solution.

Based on the embodiment corresponding to FIG. 5, in this embodiment of the present invention, the sidelink includes a sidelink synchronization signal SLSS, and the SLSS includes a primary synchronization signal PSSS and a secondary synchronization signal SSSS.

The determining module 502 is further configured to parse the PSSS to obtain a first dedicated sequence, where the first dedicated sequence is used to indicate that the first terminal is the synchronization source that uses the GNSS clock.

The determining module 502 is further configured to determine, according to the first dedicated sequence, that the first terminal is the synchronization source that uses the GNSS clock.

The synchronization module 503 is further configured to: when there are multiple first terminals, parse the SSSS to obtain a second dedicated sequence, where the second dedicated sequence includes target indication information, and the target indication information is used to indicate a priority of the first terminal in synchronization sources that use the GNSS clock.

The synchronization module 503 is further configured to determine a synchronization source priority of each first terminal according to the second dedicated sequence.

The synchronization module 503 is further configured to synchronize the terminal with a first terminal whose synchronization source priority is the highest in the multiple first terminals.

In this embodiment of the present invention, when there are multiple first terminals, the synchronization module 503 can choose to synchronize with the first terminal whose priority is the highest, thereby improving flexibility of the solution.

Based on the embodiment corresponding to FIG. 5, in this embodiment of the present invention, the sidelink synchronization information includes an MIB-SL.

The determining module 502 is further configured to parse the MIB-SL to obtain the indication information, where the indication information is used to indicate that the first terminal is the synchronization source that uses the GNSS clock.

The determining module 502 is further configured to determine, according to the indication information, that the first terminal is the synchronization source that uses the GNSS clock.

This embodiment of the present invention provides another specific manner in which the determining module 502 determines that the first terminal is the synchronization source that uses the GNSS clock, thereby improving flexibility of the solution.

Figure 6:
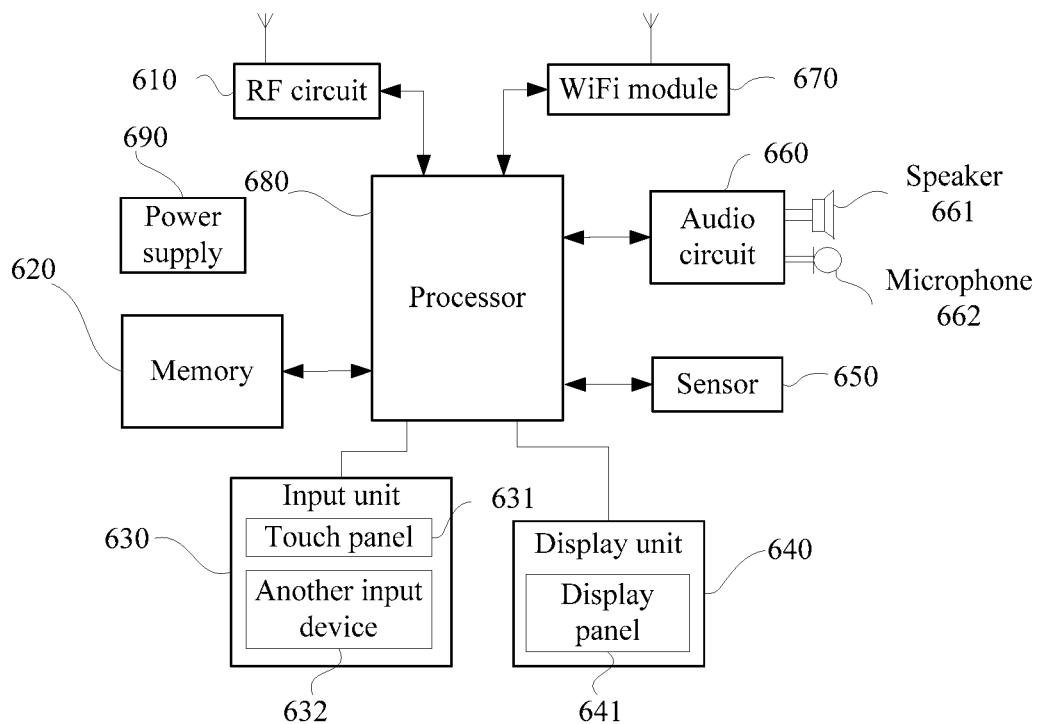
FIG. 6 is a schematic diagram of another embodiment of a terminal according to an embodiment of the present invention.

The foregoing describes the first terminal and the second terminal in the embodiments of the present invention from the perspective of module functionalization, and the following describes a first terminal and a second terminal in the embodiments of the present invention from the perspective of a hardware entity. The first terminal and the second terminal may include any terminal device such as a mobile phone, a tablet computer, and an in-vehicle computer. The following description is provided by using a mobile phone as an example. Referring to FIG. 6, another embodiment of a terminal in this embodiment of the present invention includes:

components such as a radio frequency (RF) circuit 610, a memory 620, an input unit 630, a display unit 640, a sensor 650, an audio circuit 660, a wireless fidelity (WiFi) module 670, a processor 680, and a power supply 690. A person skilled in the art may understand that the structure of the mobile phone shown in FIG. 10 does not constitute a limitation to the mobile phone, and the mobile phone may include more or fewer components than those shown in the figure, or some components may be combined, or a different component deployment may be used.

The following specifically describes the components of the mobile phone with reference to FIG. 6.

The RF circuit 610 may be configured to send or receive a signal in an information receiving and sending process or a call process. Particularly, the RF circuit 610 receives downlink information from a base station, then delivers the downlink information to the processor 680 for processing, and sends uplink data to the base station. Generally, the RF circuit 610 includes, but is not limited to, an antenna, at least one amplifier, a transceiver, a coupler, a low noise amplifier (LNA), a duplexer, and the like. In addition, the RF circuit 610 may further communicate with a network and another device by means of wireless communication. The wireless communication may use any communication standard or protocol, including but not limited to: a Global system for Mobile Communications (GSM), a general packet radio service (GPRS), Code Division Multiple Access (CDMA), Wideband Code Division Multiple Access (WCDMA), Long Term Evolution (LTE), an email, a short messaging service (SMS), and the like.

The memory 620 may be configured to store a software program and module. The processor 680 runs the software program and module stored in the memory 620, to implement various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to use of the mobile phone. In addition, the memory 620 may include a high-speed random access memory, and may also include a non-volatile memory, such as at least one magnetic disk storage device, a flash memory, or another volatile solid-state storage device.

The input unit 630 may be configured to receive input digit or character information, and generate a key signal input related to the user setting and function control of the mobile phone. Specifically, the input unit 630 may include a touch panel 631 and another input device 632. The touch panel 631, also referred to as a touchscreen, may collect a touch operation of a user on or near the touch panel (such as an operation of a user on or near the touch panel 631 by using any suitable object or accessory such as a finger or a stylus), and drive a corresponding connection apparatus according to a preset program. Optionally, the touch panel 631 may include two parts: a touch detection apparatus and a touch controller. The touch detection device detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 680. Moreover, the touch controller can receive and execute a command sent from the processor 680. In addition, the touch panel 631 may be a resistive, capacitive, infrared, or surface sound wave type touch panel. In addition to the touch panel 631, the input unit 630 may further include another input device 632. Specifically, the another input device 632 may include, but is not limited to, one or more of a physical keyboard, a functional key (such as a volume control key or a switch key), a trackball, a mouse, a joystick, or the like.

The display unit 640 may be configured to display information input by the user or information provided for the user, and various menus of the mobile phone. The display unit 640 may include a display panel 641. Optionally, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel 631 transfers the touch operation to the processor 680, so as to determine a type of a touch event. The processor 680 then provides a corresponding visual output on the display panel 641 according to the type of the touch event. Although, in FIG. 6, the touch panel 631 and the display panel 641 implement input and output functions of the mobile phone as two separate parts, in some embodiments, the touch panel 631 and the display panel 641 may be integrated to implement the input and output functions of the mobile phone.

The mobile phone may further include at least one sensor 650 such as an optical sensor, a motion sensor, and another sensor. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to an ear. As a type of motion sensor, an acceleration sensor may detect magnitudes of accelerations in various directions (generally on three axes), may detect a magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 660, a speaker 661, and a microphone 662 may provide audio interfaces between the user and the mobile phone. The audio circuit 660 may convert received audio data into an electric signal and transmit the electric signal to the speaker 661. The speaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 680 sends the audio data to, for example, another mobile phone by using the RF circuit 610, or outputs the audio data to the memory 620 for further processing.

WiFi belongs to a short-range wireless transmission technology. With the WiFi module 670, the mobile phone can help the user to send or receive an email, browse a web page, access streaming media, and the like. The WiFi module provides wireless broadband Internet access for the user. Although FIG. 6 shows the WiFi module 670, it may be understood that the WiFi module is not a necessary component of the mobile phone, and when required, the WiFi module may be omitted provided that the scope of the essence of the present invention is not changed.

The processor 680 is a control center of the mobile phone, and is connected to various parts of the mobile phone by using various interfaces and lines. By running or executing the software program and/or module stored in the memory 620, and invoking data stored in the memory 620, the processor 780 performs various functions and data processing of the mobile phone, thereby performing overall monitoring on the mobile phone. Optionally, the processor 680 may include one or more processing units. Preferably, the processor 680 may be integrated with an application processor and a modem processor. The application processor mainly processes an operating system, a user interface, an application program, and the like. The modem processor mainly processes wireless communication. It may be understood that the foregoing modem processor may not be integrated into the processor 680.

The mobile phone further includes the power supply 690 (such as a battery) for supplying power to the components. Preferably, the power supply may be logically connected to the processor 680 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment of the present invention, the processor 680 included in the first terminal performs the following procedure:

determining, according to a GNSS clock, a transmission timeslot corresponding to a current moment in a D2D system; and determining, according to the transmission timeslot and a first parameter, whether the current moment is a synchronization information sending moment.

The RF circuit 610 performs the following procedure:

obtaining first configuration information, where the first configuration information includes the first parameter; and when the processor 680 determines that the current moment is the synchronization information sending moment, sending sidelink synchronization information to the first terminal at the synchronization information sending moment, where the sidelink synchronization information carries indication information, the sidelink synchronization information is used to synchronize the second terminal with the first terminal, and the indication information is used to indicate, to the second terminal, that the first terminal is a synchronization source that uses the GNSS clock.

In another embodiment of this embodiment of the present invention, the RF circuit 610 is further configured to perform the following procedure:

obtaining second configuration information; and determining, according to the GNSS clock and the second configuration information, the transmission timeslot corresponding to the current moment in the D2D communications system.

In another embodiment of this embodiment of the present invention, the processor 680 specifically performs the following procedure:

obtaining the second configuration information in a pre-configuration manner; or obtaining the second configuration information according to a preset protocol; or the RF circuit 610 specifically performs the following procedure:

when the first terminal is within network coverage, obtaining the second configuration information by receiving system broadcast information sent by a base station; or when the first terminal is within network coverage, obtaining the second configuration information by receiving RRC signaling sent by a base station.

In another embodiment of this embodiment of the present invention, the second configuration information includes a second parameter, and the processor 680 specifically performs the following procedure:

determining the current moment according to the GNSS clock; and calculating the transmission timeslot according to the current moment and the second parameter in accordance with a preset calculation rule.

In another embodiment of this embodiment of the present invention, the second parameter includes an initial reference moment, and the processor 680 specifically performs the following procedure:

calculating a difference between the current moment and the initial reference moment; and calculating, according to the preset calculation rule and the difference, a frame number and a subframe number that correspond to the current moment in the D2D communications system.

In this embodiment of the present invention, the RF circuit 610 included in the second terminal performs the following procedure:

obtaining sidelink synchronization information sent by the first terminal, where the sidelink synchronization information carries indication information.

The processor 680 performs the following procedure:

obtaining the sidelink synchronization information sent by the first terminal, where the sidelink synchronization information carries the indication information; and synchronizing the second terminal with the first terminal according to the sidelink synchronization information.

In another embodiment of this embodiment of the present invention, the sidelink synchronization information includes an SLSS, and an SLSS includes a PSSS and an SSSS.

The processor 680 specifically performs the following procedure:

parsing the PSSS and/or the SSSS to obtain a dedicated sequence, where the dedicated sequence is used to indicate that the first terminal is a synchronization source that uses a GNSS clock; and determining, according to the dedicated sequence, that the first terminal is the synchronization source that uses the GNSS clock.

In another embodiment of this embodiment of the present invention, the sidelink synchronization information further includes an MIB-SL.

The processor 680 specifically performs the following procedure:

obtaining a timeslot boundary of the first terminal according to the SLSS;

aligning a timeslot boundary of the second terminal with the timeslot boundary of the first terminal;

determining, according to the MIB-SL, a transmission timeslot that is determined by the first terminal according to the GNSS clock and that corresponds to a current moment in a device-to-device D2D system; and aligning a transmission timeslot of the second terminal with the transmission timeslot of the first terminal.

In another embodiment of this embodiment of the present invention, the sidelink synchronization information includes an SLSS, and an SLSS includes a PSSS and an SSSS.

The processor 680 specifically performs the following procedure:

parsing the PSSS to obtain a first dedicated sequence, where the first dedicated sequence is used to indicate that the first terminal is the synchronization source that uses the GNSS clock;

determining, according to the first dedicated sequence, that the first terminal is the synchronization source that uses the GNSS clock;

when there are multiple first terminals, parsing the SSSS to obtain a second dedicated sequence, where the second dedicated sequence includes target indication information, and the target indication information is used to indicate a priority of the first terminal in synchronization sources that use the GNSS clock;

determining a synchronization source priority of each first terminal according to the second dedicated sequence; and synchronizing the second terminal with a first terminal whose synchronization source priority is the highest in the multiple first terminals.

In another embodiment of this embodiment of the present invention, the sidelink synchronization information includes an MIB-SL.

The processor 680 specifically performs the following procedure:

parsing the MIB-SL to obtain the indication information, where the indication information is used to indicate that the first terminal is the synchronization source that uses the GNSS clock; and determining, according to the indication information, that the first terminal is the synchronization source that uses the GNSS clock.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The synchronous communication method and the terminal provided in the embodiments of the present invention are described in detail above. Although the principle and implementations of the present invention are described by using specific examples in this specification, the descriptions about the embodiments are only intended to help understand the method and core ideas of the present invention. In addition, a person skilled in the art may make variations to the specific implementations and application scopes according to the ideas of the embodiments of the present invention. Therefore, the content of the specification should not be construed as a limitation to the present invention.

What is claimed is:

1. A method, comprising:
    obtaining first configuration information comprising an offset;
    determining a current time according to a global navigation satellite system (GNSS) clock;
    determining a transmission timeslot in a device-to-device (D2D) communications system according to the current time and an initial reference time, wherein the transmission timeslot includes at least one of a frame number or a subframe number in the D2D communications system;
    wherein the frame number $DFN_t$ satisfies $DFN_t = (\alpha \times (T_{current} - T_{ref})) \mod K_1$, wherein $K_1$ is a length of a frame period, $T_{current}$ is the current time, $T_{ref}$ is the initial reference time, and $\alpha$ is a scale parameter;
    wherein the subframe number $subframe_t$ satisfies $subframe_t = (b \times (T_{current} - T_{ref})) \mod K_2$, wherein $K_2$ is a length of a subframe period, and b is a second scale parameter;
    determining, according to the transmission timeslot and the offset, a synchronization-information-sending time; and
    sending sidelink synchronization information at the synchronization-information-sending time.

2. The method according to claim 1, wherein the sidelink synchronization information comprises a sidelink synchronization signal (SLSS), wherein the SLSS comprises a primary sidelink synchronization signal (PSSS) and a secondary sidelink synchronization signal (SSSS), wherein at least one of the PSSS or the SSSS comprises a first sequence, and wherein the first sequence indicates that the GNSS clock is a synchronization source.

3. The method according to claim 2, wherein at least one of:
    a priority of the synchronization source that uses the GNSS clock is higher than a priority of a synchronization source beyond network coverage that does not use the GNSS clock;
    a priority of the synchronization source that uses the GNSS clock is higher than a priority of a synchronization source beyond network coverage that does not use the GNSS clock and a priority of a cell within network coverage; or
    a priority of the synchronization source that uses the GNSS clock is higher than a priority of a synchronization source beyond network coverage that does not use the GNSS clock but lower than a priority of a cell within network coverage.

4. The method according to claim 2, wherein the sidelink synchronization information further comprises a sidelink master information block (MIB-SL), and wherein the MIB-SL comprises information about the transmission timeslot in the D2D communications system.

5. The method according to claim 1, wherein obtaining the first configuration information comprises one of:
    obtaining the first configuration information in a pre-configuration manner;

when a first terminal is within network coverage, obtaining the first configuration information by receiving system broadcast information from a base station;
when the first terminal is within network coverage, obtaining the first configuration information by receiving radio resource control (RRC) signaling from the base station; or
obtaining the first configuration information according to a preset protocol.

6. A method, comprising:
obtaining sidelink synchronization information from a first terminal at a synchronization-information-sending time;
determining, according to indication information included in the sidelink synchronization information, that a synchronization source of the first terminal is a global navigation satellite system (GNSS) clock; and
synchronizing with the first terminal according to the sidelink synchronization information;
wherein the synchronization-information-sending time is determined according to a transmission timeslot in a device-to-device (D2D) communications system and an offset by the first terminal;
wherein the transmission timeslot includes at least one of a frame number or a subframe number in the D2D communications system; and
wherein the frame number $DFN_t$ satisfies $$DFN_t = (\alpha \times (T_{current} - T_{ref})) \bmod K_1, \text{ wherein}$$

$K_1$ is a length of a frame period, $T_{current}$ is the current time, $T_{ref}$ is the initial reference time, and $\alpha$ is a scale parameter;
wherein the subframe number $subframe_t$ satisfies $$subframe_t = (b \times (T_{current} - T_{ref})) \bmod K_2, \text{ wherein}$$

$K_2$ is a length of a subframe period, and b is a second scale parameter.

7. The method according to claim 6, wherein the sidelink synchronization information comprises a sidelink synchronization signal (SLSS), wherein the SLSS comprises a primary synchronization signal (PSSS) and a secondary synchronization signal (SSSS), and wherein determining that the synchronization source of the first terminal is the GNSS clock comprises:
parsing at least one of the PSSS or the SSSS to obtain a first sequence, wherein the first sequence indicates that the synchronization source is the GNSS clock.

8. The method according to claim 7, wherein the sidelink synchronization information further comprises a sidelink master information block (MIB-SL), wherein the MIB-SL comprises the transmission timeslot in the D2D communications system which is determined according to the GNSS clock, and wherein synchronizing with the first terminal according to the sidelink synchronization information comprises:
obtaining a timeslot boundary of the first terminal according to the SLSS;
aligning a timeslot boundary with the timeslot boundary of the first terminal; and
aligning a transmission timeslot with the transmission timeslot in the D2D communications system.

9. An apparatus, comprising:
at least one processor;
a non-transitory computer-readable storage medium coupled to the at least one processor and storing programming instructions for execution by the at least one processor, wherein the programming instructions instruct the at least one processor to:
obtain first configuration information comprising an offset;
determine a current time according to a global navigation satellite system (GNSS) clock;
determine a transmission timeslot in a device-to-device (D2D) communications system according to the current time and an initial reference time, wherein the transmission timeslot includes at least one of a frame number or a subframe number in the D2D communications system;
wherein the frame number $DFN_t$ satisfies $$DFN_t = (\alpha \times (T_{current} - T_{ref})) \bmod K_1, \text{ wherein}$$

$K_1$ is a length of a frame period, $T_{current}$ is the current time, $T_{ref}$ is the initial reference time, and $\alpha$ is a scale parameter;
wherein the subframe number $subframe_t$ satisfies $$subframe_t = (b \times (T_{current} - T_{ref})) \bmod K_2, \text{ wherein}$$

$K_2$ is a length of a subframe period, and b is a second scale parameter;
determine, according to the transmission timeslot in the D2D communications system and the first configuration information, a synchronization-information-sending time; and
send sidelink synchronization information at the synchronization-information-sending time.

10. The apparatus according to claim 9, wherein the sidelink synchronization information comprises a sidelink synchronization signal (SLSS), wherein the SLSS comprises a primary sidelink synchronization signal (PSSS) and a secondary sidelink synchronization signal (SSSS), wherein at least one of the PSSS or the SSSS comprises a first sequence, and wherein the first sequence indicates that the GNSS clock is a synchronization source.

11. The apparatus according to claim 10, wherein at least one of:
a priority of the synchronization source that uses the GNSS clock is higher than a priority of a synchronization source beyond network coverage that does not use the GNSS clock;
a priority of the synchronization source that uses the GNSS clock is higher than a priority of a synchronization source beyond network coverage that does not use the GNSS clock and a priority of a cell within network coverage; or
a priority of the synchronization source that uses the GNSS clock is higher than a priority of a synchronization source beyond network coverage that does not use the GNSS clock but lower than a priority of a cell within network coverage.

12. The apparatus according to claim 10, wherein the sidelink synchronization information further comprises a sidelink master information block (MIB-SL), and wherein the MIB-SL comprises information about the transmission timeslot in the D2D communications system.

13. The apparatus according to claim 9, wherein obtaining the first configuration information comprises one of:
obtaining the first configuration information in a pre-configuration manner;
when the apparatus is within network coverage, obtaining the first configuration information by receiving system broadcast information from a base station;

when the apparatus is within network coverage, obtaining the first configuration information by receiving RRC signaling from the base station; or obtaining the first configuration information according to a preset protocol.

14. An apparatus, comprising:
at least one processor;
a non-transitory computer-readable storage medium coupled to the at least one processor and storing programming instructions for execution by the at least one processor, wherein the programming instructions instruct the at least one processor to:
obtain sidelink synchronization information from a first terminal at a synchronization-information-sending time;
determine, according to indication information included in the sidelink synchronization information, that a synchronization source of the first terminal is a global navigation satellite system (GNSS) clock; and
synchronize with the first terminal according to the sidelink synchronization information;
wherein the synchronization-information-sending time is determined according to a transmission timeslot in a device-to-device (D2D) communications system and an offset by the first terminal;
wherein the transmission timeslot includes at least one of a frame number or a subframe number in the D2D communications system; and
wherein the frame number $DFN_t$ satisfies $DFN_t = (\alpha \times (T_{current} - T_{ref})) \bmod K_1$, wherein $K_1$ is a length of a frame period, $T_{current}$ is the current time, $T_{ref}$ is the initial reference time, and $\alpha$ is a scale parameter;
wherein the subframe number $subframe_t$ satisfies $subframe_t = (b \times (T_{current} - T_{ref})) \bmod K_2$, wherein $K_2$ is a length of a subframe period, and b is a second scale parameter.

15. The apparatus according to claim 14, wherein the sidelink synchronization information comprises a sidelink synchronization signal (SLSS), wherein the SLSS comprises a primary synchronization signal (PSSS) and a secondary synchronization signal (SSSS), and wherein determining that the synchronization source of the first terminal is the GNSS clock comprises:
parsing at least one of the PSSS or the SSSS to obtain a first sequence, wherein the first sequence indicates that the synchronization source is the GNSS clock.

16. The apparatus according to claim 15, wherein the sidelink synchronization information further comprises a sidelink master information block (MIB-SL), wherein the MIB-SL comprises the transmission timeslot in the D2D communications system which is determined according to the GNSS clock, and wherein synchronizing with the first terminal according to the sidelink synchronization information comprises:
obtaining a timeslot boundary of the first terminal according to the SLSS;
aligning a timeslot boundary of the apparatus with the timeslot boundary of the first terminal; and
aligning a transmission timeslot of the apparatus with the transmission timeslot in the D2D communications system.

17. The method according to claim 1, wherein a frame number and a subframe number of the synchronization-information-sending time satisfy a formula of:
$(c * DFN_t + subframe_t) \bmod K_3 = syncOffsetIndicator$,
wherein $subframe_t$ is the subframe number, $DFN_t$ is the frame number, c is a quantity of subframes included in one frame, $K_3$ is a synchronization sending period, and syncOffsetIndicator is the offset.

18. The apparatus according to claim 9, wherein a frame number and a subframe number of the synchronization-information-sending time satisfy a formula of:
$(c * DFN_t + subframe_t) \bmod K_3 = syncOffsetIndicator$,
wherein $subframe_t$ is the subframe number, $DFN_t$ is the frame number, c is a quantity of subframes included in one frame, $K_3$ is a synchronization sending period, and syncOffsetIndicator is the offset.

19. The method according to claim 6, wherein a frame number and a subframe number of the synchronization-information-sending time satisfy a formula of:
$(c * DFN_t + subframe_t) \bmod K_3 = syncOffsetIndicator$,
wherein $subframe_t$ is the subframe number, $DFN_t$ is the frame number, c is a quantity of subframes included in one frame, $K_3$ is a synchronization sending period, and syncOffsetIndicator is the offset.

20. The apparatus according to claim 14, wherein a frame number and a subframe number of the synchronization-information-sending time satisfy a formula of:
$(c * DFN_t + subframe_t) \bmod K_3 = syncOffsetIndicator$,
wherein $subframe_t$ is the subframe number, $DFN_t$ is the frame number, c is a quantity of subframes included in one frame, $K_3$ is a synchronization sending period, and syncOffsetIndicator is the offset.

* * * * *

UNITED STATES PATENT AND TRADEMARK OFFICE
CERTIFICATE OF CORRECTION

PATENT NO. : 11,606,766 B2
APPLICATION NO. : 16/910939
DATED : March 14, 2023
INVENTOR(S) : Mingchao Li et al.

It is certified that error appears in the above-identified patent and that said Letters Patent is hereby corrected as shown below:

In the Claims

In Column 34, In Line 20, In Claim 1, delete "($\alpha^x$" and insert -- ($a^x$ --.

In Column 34, In Line 23, In Claim 1, delete "$\alpha$" and insert -- a --.

In Column 34, In Line 27, In Claim 1, delete "mod $K_2$," and insert -- mod$K_2$, --.

In Column 35, In Line 29, In Claim 6, delete "($\alpha^x$" and insert -- ($a^x$ --.

In Column 35, In Line 31, In Claim 6, delete "$\alpha$" and insert -- a --.

In Column 35, In Line 36, In Claim 6, delete "mod $K_2$," and insert -- mod$K_2$, --.

In Column 35, In Line 42, In Claim 7, after "primary" insert -- sidelink --.

In Column 35, In Line 42, In Claim 7, after "secondary" insert -- sidelink --.

In Column 36, In Line 15, In Claim 9, delete "($\alpha^x$" and insert -- ($a^x$ --.

In Column 36, In Line 18, In Claim 9, delete "$\alpha$" and insert -- a --.

In Column 36, In Line 22, In Claim 9, delete "mod $K_2$," and insert -- mod$K_2$, --.

In Column 37, In Line 30, In Claim 14, delete "($\alpha^x$" and insert -- ($a^x$ --.

In Column 37, In Line 33, In Claim 14, delete "$\alpha$" and insert -- a --.

In Column 37, In Line 37, In Claim 14, delete "mod $K_2$," and insert -- mod$K_2$, --.

Signed and Sealed this
Seventeenth Day of October, 2023

Katherine Kelly Vidal
*Director of the United States Patent and Trademark Office*

In Column 37, In Line 42, In Claim 15, after "primary" insert -- sidelink --.

In Column 37, In Line 42, In Claim 15, after "secondary" insert -- sidelink --.